(12) United States Patent
Lewis et al.

(10) Patent No.: US 7,810,656 B2
(45) Date of Patent: Oct. 12, 2010

(54) MODULAR STORAGE RACK

(76) Inventors: Lyman F. Lewis, 1480 Ellen, SW., Wyoming, MI (US) 49809; Ronald L. Ducharme, 7903 Ventore Ave., Sparta, MI (US) 49345

( * ) Notice: Subject to any disclaimer, the term of this patent is extended or adjusted under 35 U.S.C. 154(b) by 1120 days.

(21) Appl. No.: 11/273,970

(22) Filed: Nov. 15, 2005

(65) Prior Publication Data

US 2006/0065614 A1 Mar. 30, 2006

Related U.S. Application Data

(63) Continuation of application No. 10/776,979, filed on Feb. 10, 2004, now abandoned.

(60) Provisional application No. 60/446,925, filed on Feb. 10, 2003.

(51) Int. Cl.
A47F 5/08 (2006.01)

(52) U.S. Cl. .................................................. 211/151

(58) Field of Classification Search ................ 211/151, 211/186, 194, 59.2, 162; 414/276, 522; 198/833
See application file for complete search history.

(56) References Cited

U.S. PATENT DOCUMENTS

| | | | | |
|---|---|---|---|---|
| 1,026,617 A | * | 5/1912 | Turnbull | 198/834 |
| 3,289,817 A | * | 12/1966 | McLaughlin | 198/833 |
| 4,662,511 A | * | 5/1987 | Greener | 198/834 |
| 4,825,999 A | * | 5/1989 | Hammer | 198/834 |
| 5,538,384 A | * | 7/1996 | Haldimann | 414/286 |
| 5,638,965 A | * | 6/1997 | Mattingly et al. | 211/151 |
| 5,873,473 A | * | 2/1999 | Pater | 211/183 |
| 5,944,202 A | * | 8/1999 | Wylie | 211/151 |
| 5,951,228 A | * | 9/1999 | Pfeiffer et al. | 414/276 |
| 6,112,915 A | * | 9/2000 | Lewis | 211/151 |
| 6,186,725 B1 | * | 2/2001 | Konstant | 414/276 |
| 6,431,378 B1 | * | 8/2002 | Lewis | 211/151 |
| 6,431,808 B1 | * | 8/2002 | Lowrey et al. | 414/276 |
| RE38,517 E | * | 5/2004 | Pfeiffer et al. | 414/276 |
| 7,114,606 B2 | * | 10/2006 | Shaw et al. | 193/35 R |
| 7,200,903 B2 | * | 4/2007 | Shaw et al. | 24/453 |
| 2002/0190018 A1 | * | 12/2002 | Lewis | 211/151 |
| 2006/0065614 A1 | * | 3/2006 | Lewis et al. | 211/151 |
| 2006/0157434 A1 | * | 7/2006 | Dreisbach et al. | 211/151 |

* cited by examiner

*Primary Examiner*—Sarah Purol
(74) *Attorney, Agent, or Firm*—John A. Waters; Waters & Associates PLC

(57) ABSTRACT

A modular flow through or push back storage rack system has a transfer assembly with a plurality of modular carriage units located in a warehouse storage bay. The carriage units are arranged in side-by-side pairs. Each side-by-side pair of carriages defines a space between the carriages. Further, the side-by-side pairs of carriages are arranged in end-to-end alignment. Each carriage is preferably provided as an endless loop link track. An inter-carriage transport unit extends between a space between one side-by-side pair of carriage units and another space between an adjacent pair of side-by-side carriage units. Each of the carriage units and the transport unit may be supported by a cross beam. The transport unit preferably extends between adjacent cross beams of adjacent pairs of carriages. The transfer assembly maintains the storage units at a substantially level plane and may modulate a transfer speed of the storage units between adjacent carriages.

7 Claims, 29 Drawing Sheets

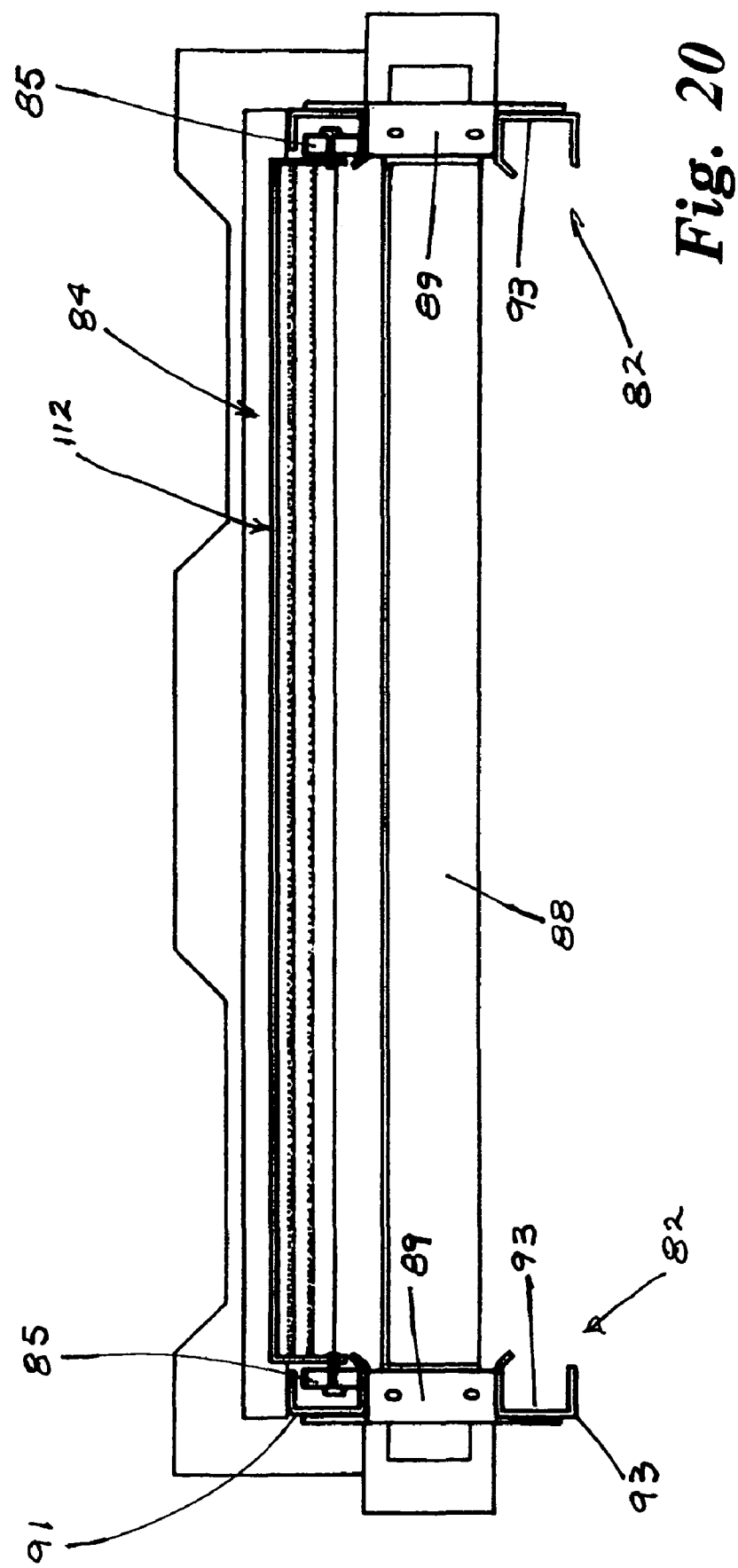

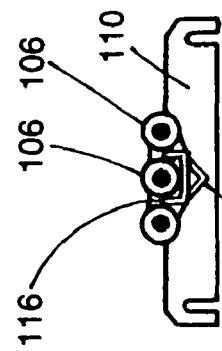
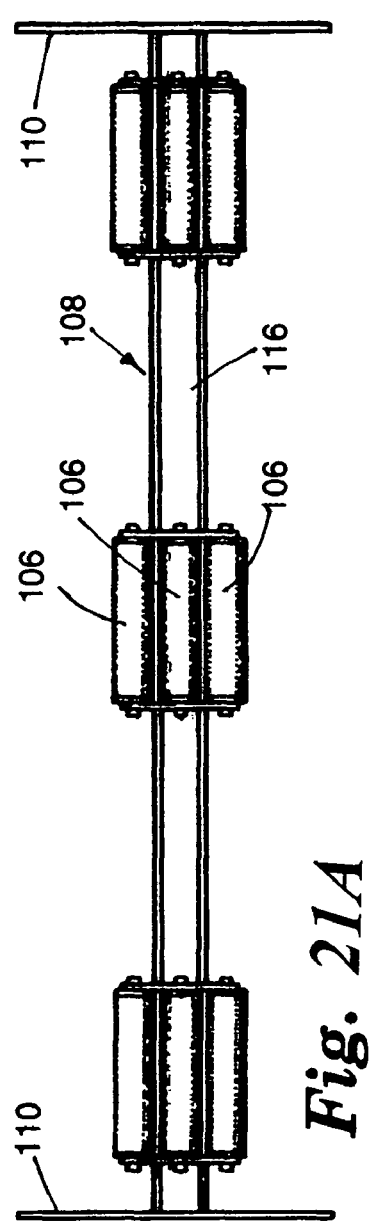
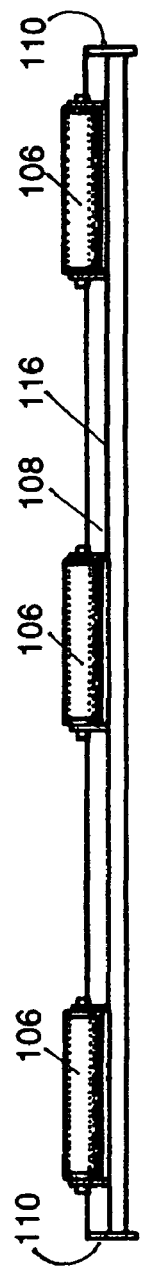

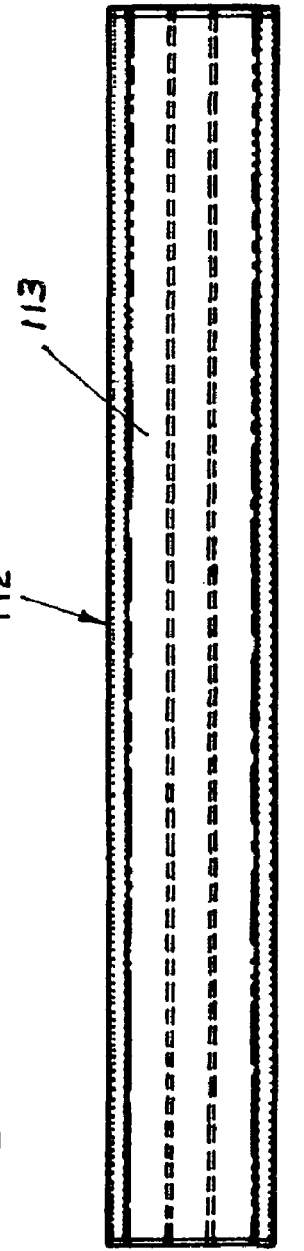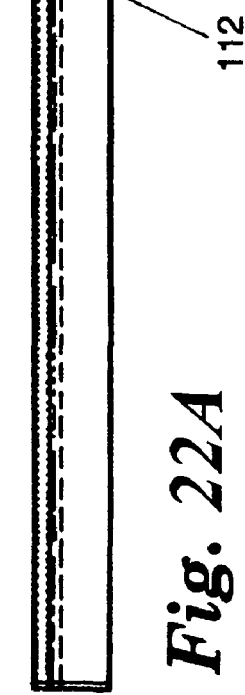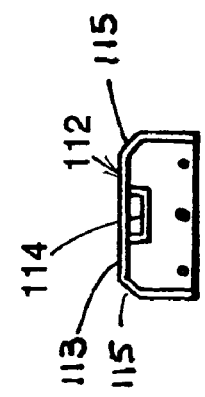

MODULAR STORAGE RACK

CROSS-REFERENCES TO RELATED APPLICATIONS

This is a continuing non-provisional application of U.S. non-provisional patent application Ser. No. 10/776,979, entitled Modular Storage Rack and filed on Feb. 10, 2004 now abandoned by Lewis et alia, the disclosure of which is incorporated here by reference and which is a continuing non-provisional application of its co-pending U.S. provisional Patent Application Ser. No. 60/446,925, entitled Modular Storage Rack and filed on Feb. 10, 2003, by Lewis et alia, the disclosure of which is incorporated here by reference.

BACKGROUND OF THE INVENTION

The present invention relates to storage racks used in warehousing and more particularly to a storage rack wherein modular pallet carriers convey pallets back or through a storage bay having a multiple pallet depth.

Warehouse storage racks typically comprise a frame structure divided into rows and columns that define storage bays for depositing storage units, commonly pallets, of products to be stored. In order to conserve space in a storage facility, storage bays are sometimes more than one pallet deep. Movable carriers mounted on tracks are sometimes used to permit pallets to be moved to rearward storage locations from a single loading station at the front of the rack system. One such rack system is a "push back system" or "roll back system", wherein pallets are loaded at a front of the storage bay and pushed rearward by the next pallets as they are loaded on the rack. Then the pallets are unloaded from the front of the storage bay on a last in, first out (LIFO) basis. In another storage rack system, pallets are loaded at one end of the storage bay and pushed through the storage bay and unloaded from the other side of the storage bay. These are known as "flow through systems," and facilitate first in, first out (FIFO) product flow.

A push back or roll back storage rack system is disclosed in Applicant's U.S. Pat. No. 6,431,378, the disclosure of which is incorporated here by reference. One of the embodiments disclosed in this patent is a modular system wherein modular track sections are mounted in a storage rack and interconnected to provide a push back type of rack (see FIGS. 22-44). The present invention provides an improved modular rack system that is adaptable to either a flow-through system or a push back system.

For purposes of illustration, a flow-through system will be described. The end of the storage bay where goods are loaded on to the rack will be referred to as the front of the rack, whereas the opposite end of the rack where goods are unloaded will be referred to as the rear or back of the rack. Goods moving in a forward direction through the rack are goods moving from the front to the rear of the storage bay.

SUMMARY OF THE INVENTION

A modular storage rack, in accordance with the present invention is mounted in a frame defining at least one storage bay having a depth sufficient to accommodate a plurality of separate storage units in separate horizontally spaced sections of the storage bay. The frame comprises cross beams between the ends of adjacent sections of the storage bay. A plurality of modular carriage units extend end to end across the storage bay. Each carriage unit includes an endless loop oval track section with spaced, interconnected wheeled carrier members being connected in an endless loop and mounted for movement around the track section. Each carriage unit extends into proximity to the cross beams at the ends of a storage bay section. Mounting brackets may interconnect the track sections with the cross beams so as to support the carriage units with the beams near opposite ends of the storage bay sections. The carriage units are mounted in spaced pairs in each bay section. A transfer assembly is mounted in the frame between adjacent pairs of carriage units. The transfer assembly is a mini-carriage unit with an endless loop oval track section with spaced, interconnected wheeled carrier members being connected in an endless loop and mounted for movement around the track section. The mini-carriage transfer unit is positioned substantially at the same level as the upper side of the carriage units, such that storage units are maintained at a substantially level plane as they are transferred from one storage bay to an adjacent storage bay.

The carriage members of the present invention preferably include plate members having horizontal storage unit support surfaces, the plate members being inclined downward at opposite sides of the support surfaces so as to provide close clearance between the plate members and the transfer assembly when the plate members move around arcuate sections of the track at the ends thereof.

These and other features and benefits of the invention will be recognized by one having ordinary skill in the art and by those who practice the invention, from the specification, the claims, and the drawing figures.

BRIEF DESCRIPTION OF THE SEVERAL VIEWS OF THE DRAWING

FIG. 20 is a cross section view of the pallet storage mechanism of FIG. 9, facing the front end of the storage bay.

FIGS. 21A, 21B, and 21C are top, front end, and side views, respectively, of the roller transfer assembly of the embodiment of FIG. 9.

FIGS. 22A, 22B, and 22C are front edge, top, and end views, respectively, of the carrier of FIG. 9, with the end of the carrier being removed to show the interior thereof.

DETAILED DESCRIPTION OF THE INVENTION

Figure 1:
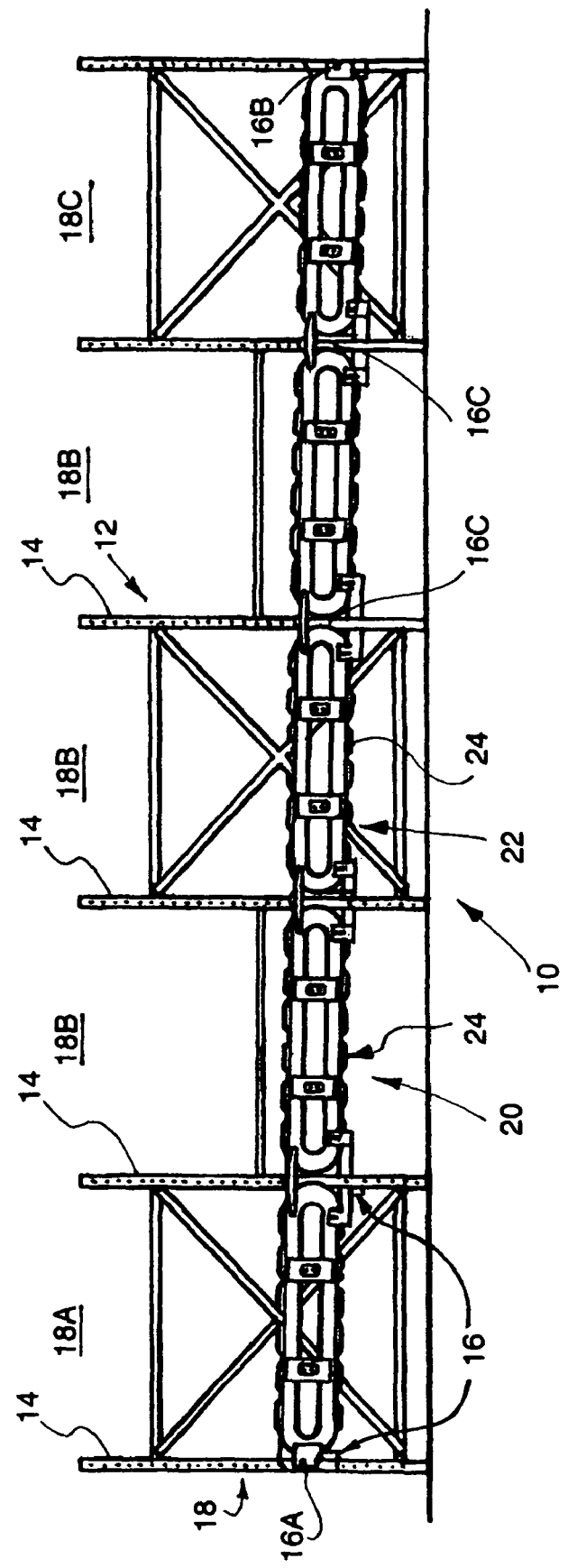
FIG. 1 is a side elevation view of a first embodiment of a storage rack employing a modular flow through pallet support mechanism constructed in accordance with the present invention.
Figure 2:
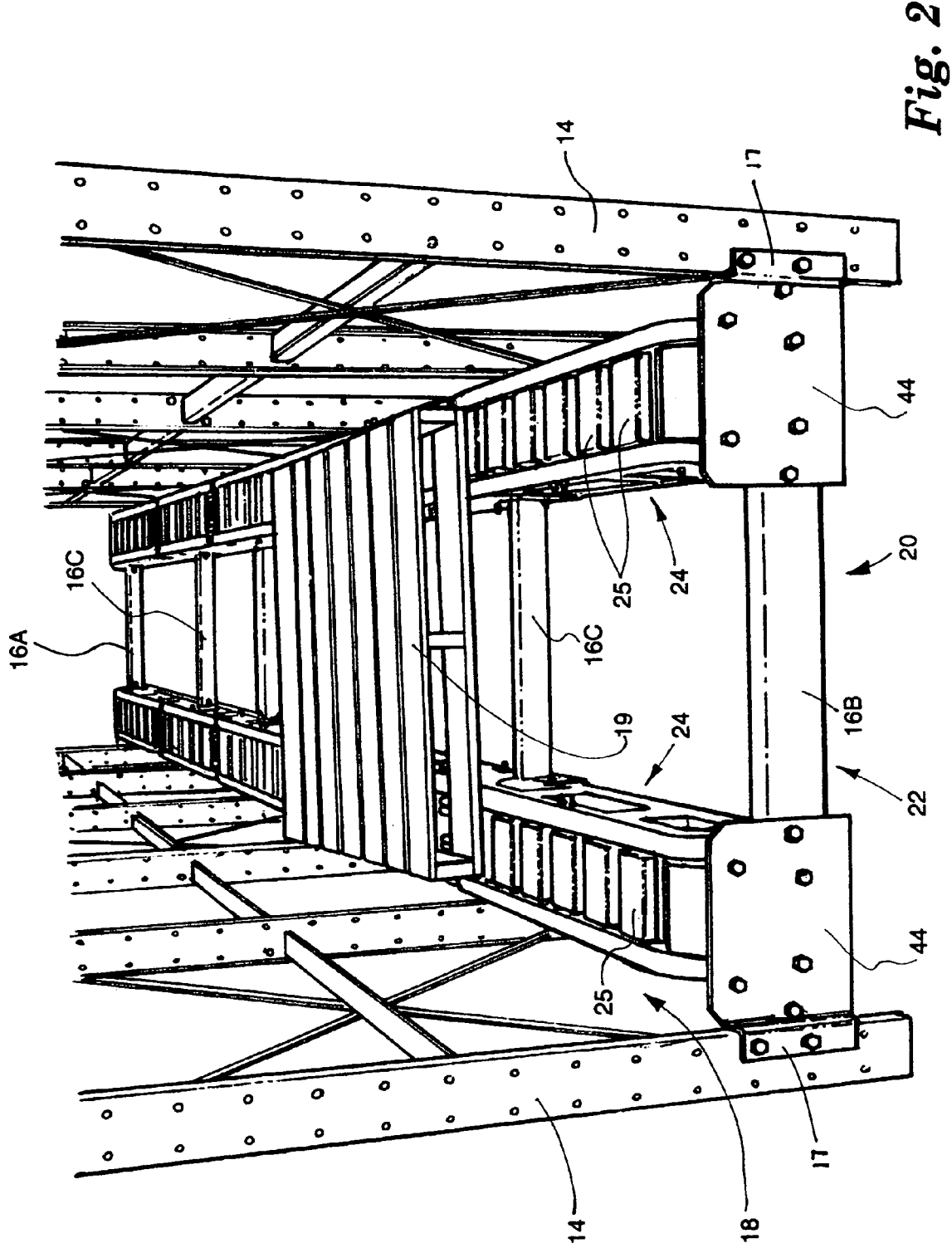
FIG. 2 is a perspective view of the rack and pallet support mechanism of FIG. 1, taken from the rear end of the support mechanism.
Figure 3:
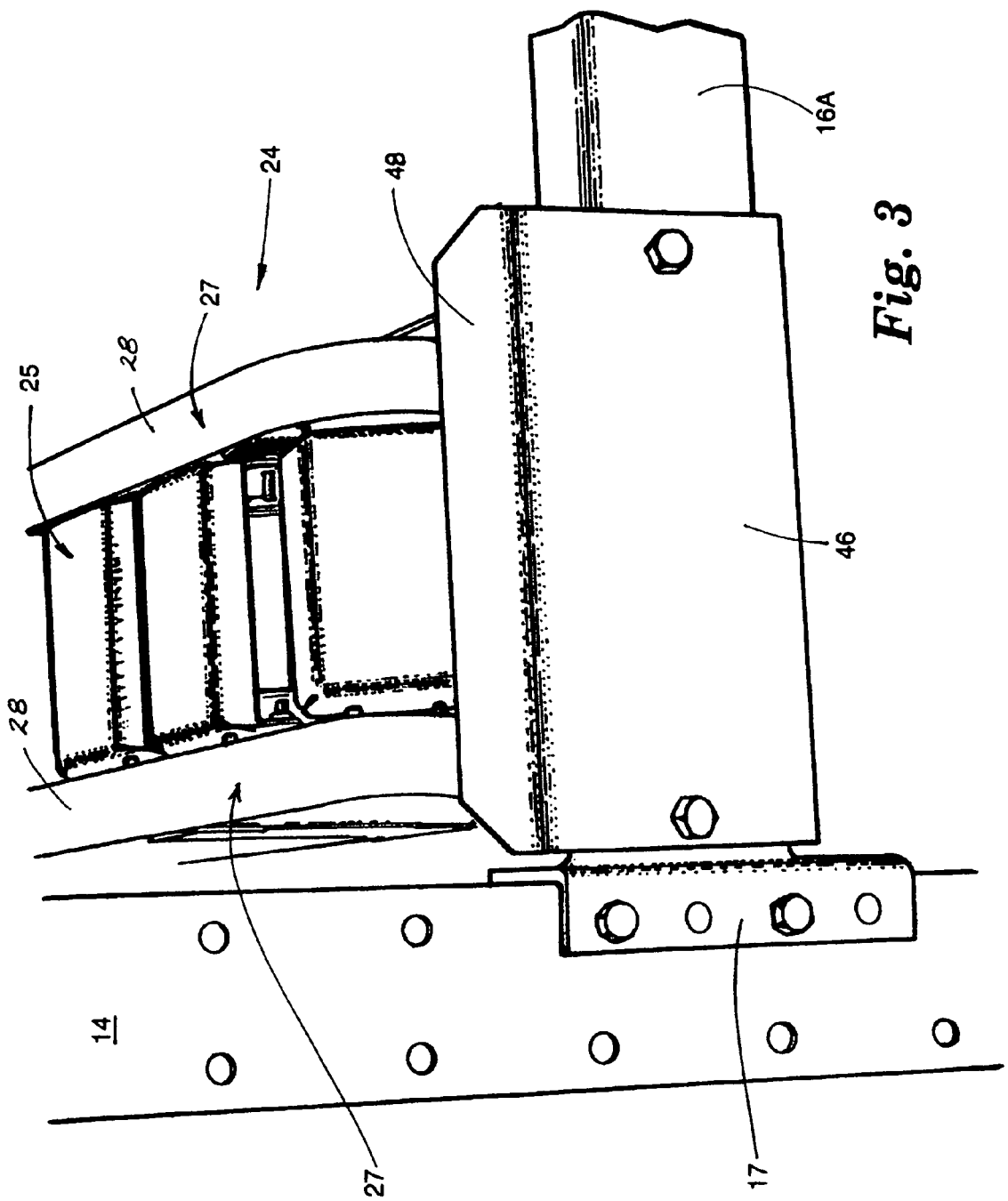
FIG. 3 is a perspective view of the front end of the pallet support mechanism of FIG. 1.

Referring now to the drawings, an exemplary warehousing storage rack system 10, shown in FIG. 1, comprises a frame or rack 12 consisting of spaced vertical columns or uprights 14 and horizontal cross beams 16 that define a series of vertically and horizontally spaced storage bays 18. A single storage bay is shown in FIG. 1, with the storage bay comprising a front section 18A, three intermediate sections 18B, and a rear section 18C. Each storage bay section is positioned one behind the other and is sized to accommodate a standard size of storage unit. The storage unit is commonly a pallet 19, which is loaded in the storage bay by a forklift truck. Pallet 19 supports products or goods that are being stored in the rack. A typical pallet is about 40 inches (1016 mm) wide and about 48 inches (1219 mm) long and about 5 inches (127 mm) tall. For exemplary purposes, a rack designed to accommodate a standard pallet is illustrated. The horizontal cross beams 16 at the bottom of storage bay 18 include front and rear load beams 16A and 16B respectively and intermediate beams 16C, which typically are box beams, I beams, or C-shaped beams. The cross beams may be bolted to the uprights by brackets 17 at the ends of the beams in preformed spaced holes in the uprights. The beam brackets 17 have holes spaced at one inch intervals and the uprights have holes spaced two inches apart. Thus, a flow-through system 20 illustrated in FIG. 1 can be mounted at an inclined angle simply by mounting the cross beams at different heights in the mounting holes.

A first embodiment of a flow-through system 20 comprises a movable pallet carriage mechanism 22 mounted on the horizontal beams 16 at the bottom of the storage bay and extending in a longitudinal direction between the front and the back of the bay. The carriage mechanism shown in FIGS. 2-8 includes two laterally spaced rows of aligned, modular carriage units 24. Each carriage unit 24 is mounted at front and rear ends thereof to cross beams 16. Each carriage unit module includes a series of wheeled carriers 25 pivotally interconnected by links 38 so as to form a continuous loop that is positioned on a generally oval track 26 which is also formed in the shape of a continuous loop. Track 26 includes a pair of laterally spaced left and right track sections 27 having opposed G-shaped cross sections, with open sides of the track sections facing each other. These cross sections are the same as the cross section of track section 82, as shown in FIG. 20. Each track section 27 includes an upper support rail 28, a lower support rail 30, and a curved section 32 at each end interconnecting the upper and lower support rails into an oval loop. The upper and lower rails of each track section are spaced apart by spreader support brackets 33 welded to the rails. The left and right track sections are connected together by cross braces 35 that extend between spreader support brackets. The whole assembly of spaced track sections is thus one integral unit.

The wheeled carrier members 25 each comprise a horizontal support surface 41, with side flanges 43 extending downward from opposite sides thereof. Wheels 36 are mounted on outer sides of each side flange and ride in the left and right track sections 27.

Referring to the embodiment shown in FIGS. 2-8, this pallet support mechanism employs two rows of aligned modular carriage units 24 on each side of the storage bay 18. Pallet 19 is suspended between the two rows of modular carriage units. The rear end of the flow-through system includes a pair of stop plates 44 bolted to cross beam 16B and extending upward so as to stop the pallet when it comes to the end of the track.

The front end of the carriage mechanism includes plate 46 that is bolted to cross beam 16A and extends upward therefrom and then has an inclined upper surface 48 that extends rearward. The inclined surface prevents a pallet from damaging the front end of the pallet support mechanism and causes the pallet to be cammed upward on top of the pallet support mechanism.

Figure 4:
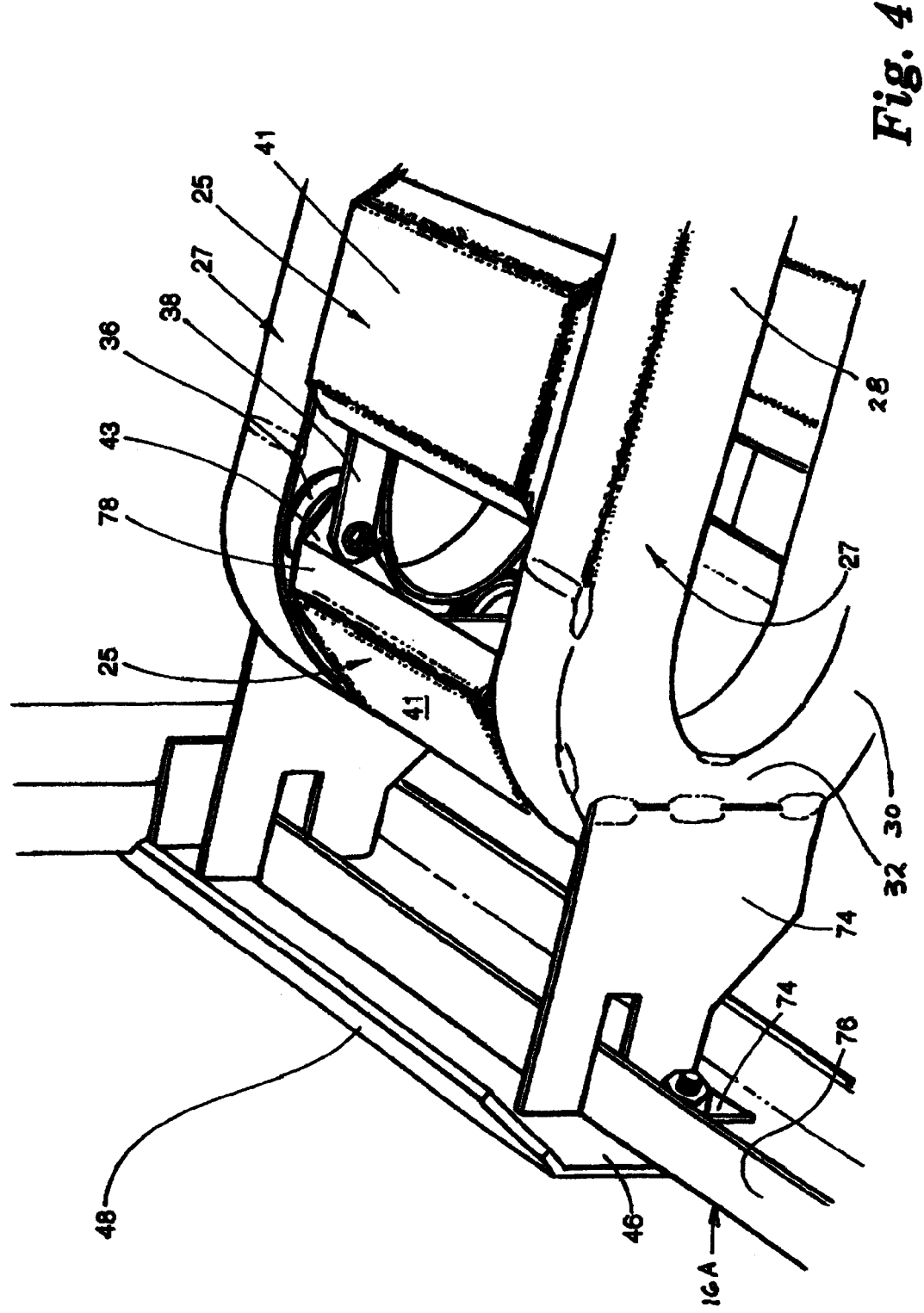
FIG. 4 is a perspective view of the front support mechanism of FIG. 3, taken from the rear side thereof.
Figure 5:
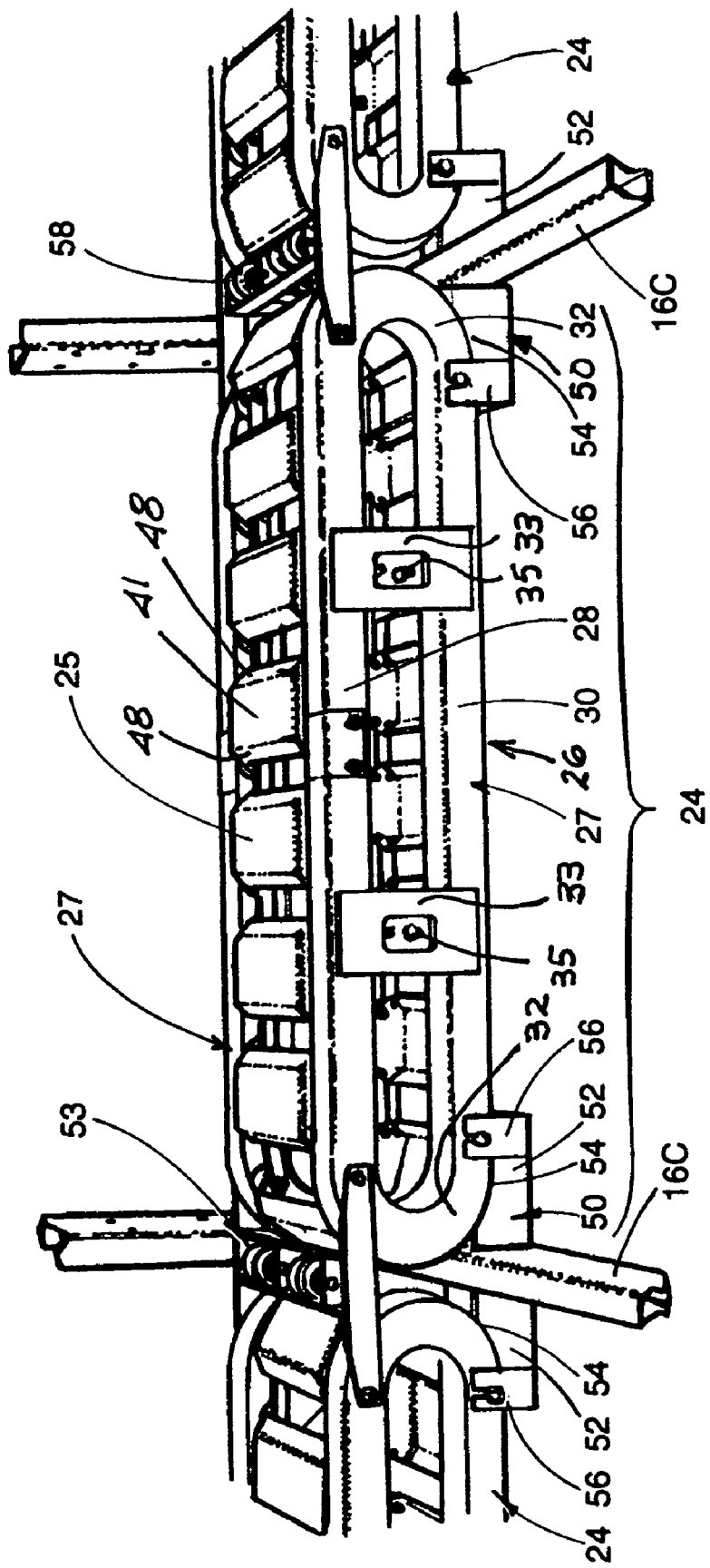
FIG. 5 is a perspective view showing three aligned modular carriage units of the flow through system mounted on spaced cross beams of the storage rack.
Figure 6:
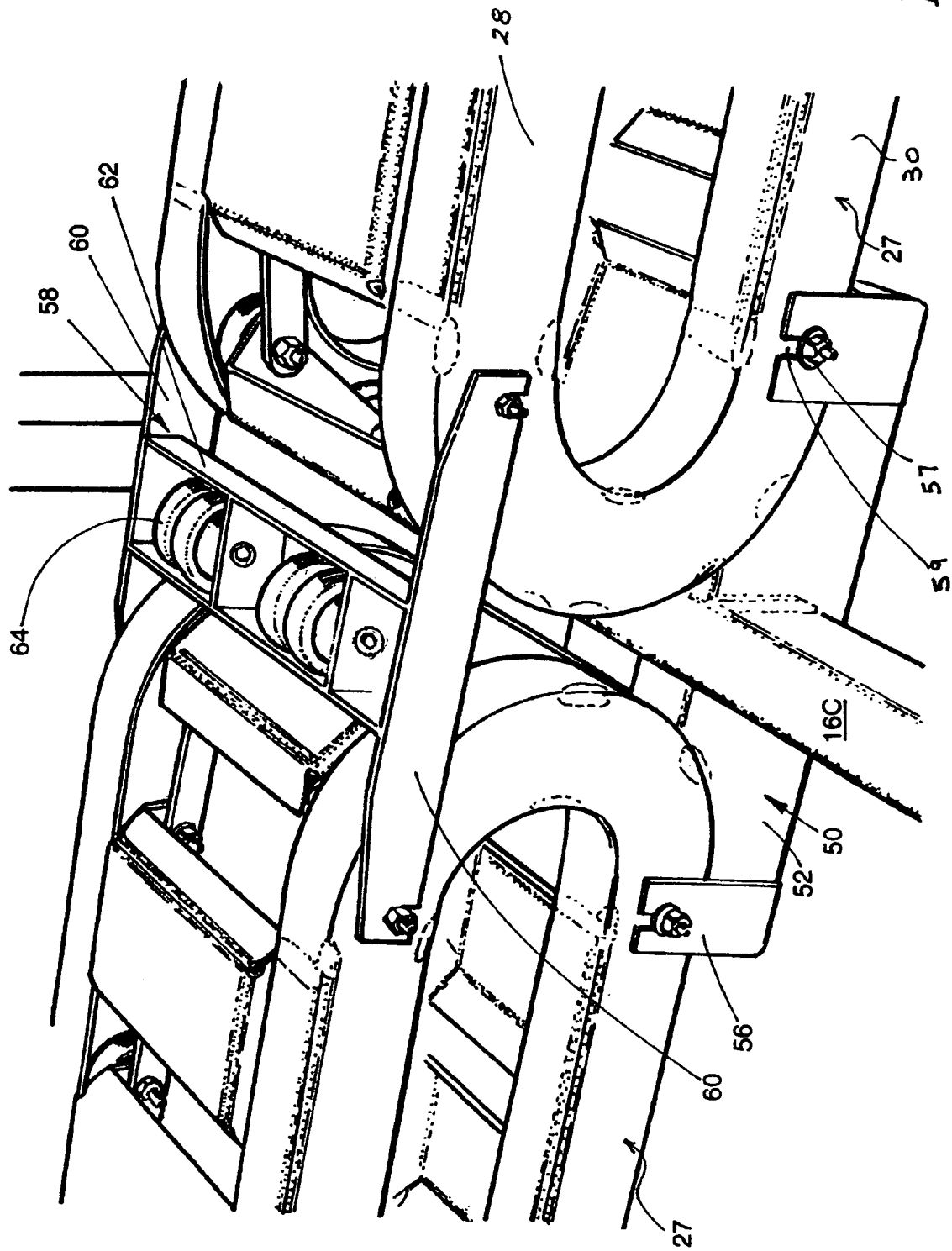
FIG. 6 is a perspective view showing the junction between adjoining carriage units mounted on the same intermediate cross beam, and showing a pallet transfer assembly mounted between the ends of the adjacent modules.
Figure 7:
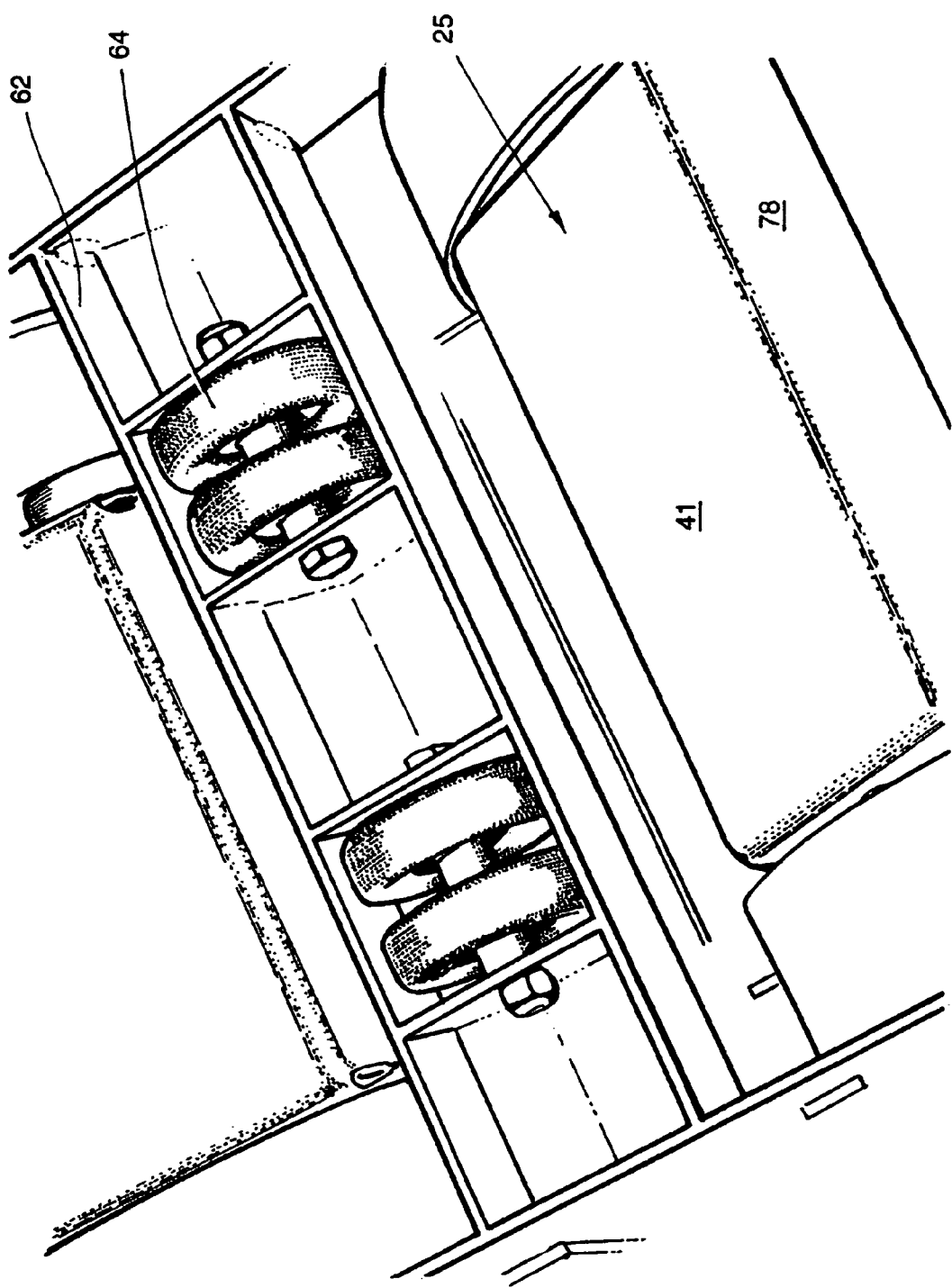
FIG. 7 is a perspective view of the pallet transfer assembly of FIG. 6.

The manner in which modular carriage units 24 are mounted in the storage bay is shown in FIGS. 4-7. Referring to FIG. 5, a carriage unit module 24 is integrally formed as a unit with oval left and right track sections 27 on each side thereof and with the carrier members pivotally interconnected in an endless loop being mounted to the two track sections and being positioned between the track sections. Each end of the modular unit 24 extends relatively closely to the cross beam at each end of the pallet position in the bay. The curved end of each unit is mounted to the cross beam in the embodiment shown in FIG. 5 by means of a saddle 50 welded to the cross beam and having arms 52 having arcuate upper surfaces 54 extending outward therefrom. Brackets 56 mounted on the outer ends of the arms and bolted by bolts 57 to the track by vertical slots 59 in the brackets hold the track in a nested position against the saddle. This construction is employed at all intermediate beams along the length of the pallet support mechanism.

An important feature of the present invention is the incorporation of a pallet transfer assembly 58 between each adjacent section of the modular carriage assembly. Pallet transfer assembly 58 includes a bracket 60 bolted to the upper ends of each adjacent track module, with a wheel support frame 62 extending between the brackets and with a plurality of wheels 64 being rotatably mounted in the wheel support frame for rotation about a transverse axis. The upper plane of the wheels is at the same level as the upper plane of the support surfaces of the carrier members. Without the wheels, when the pallets reach the end of each carriage unit, the ends of the pallets tend to drop downward somewhat and then engage the next adjacent carriage unit partially in the side of the unit. This can cause the pallets to stop their even flow along the pallet support mechanism. The wheels of the transfer mechanism cause the pallets to flow smoothly from one modular section to the next. The wheels also have another advantage, in that they tend to slow the movement of the pallets along the pallet support mechanism. When the pallets are on the wheeled carrier members, they tend to pick up momentum and increase speed, but when they engage the transfer mechanism, some of the momentum is absorbed by the transfer mechanism and the pallets tend to slow down. This causes a natural modulation of the speed of the pallets along the carrier mechanism.

Figure 8:
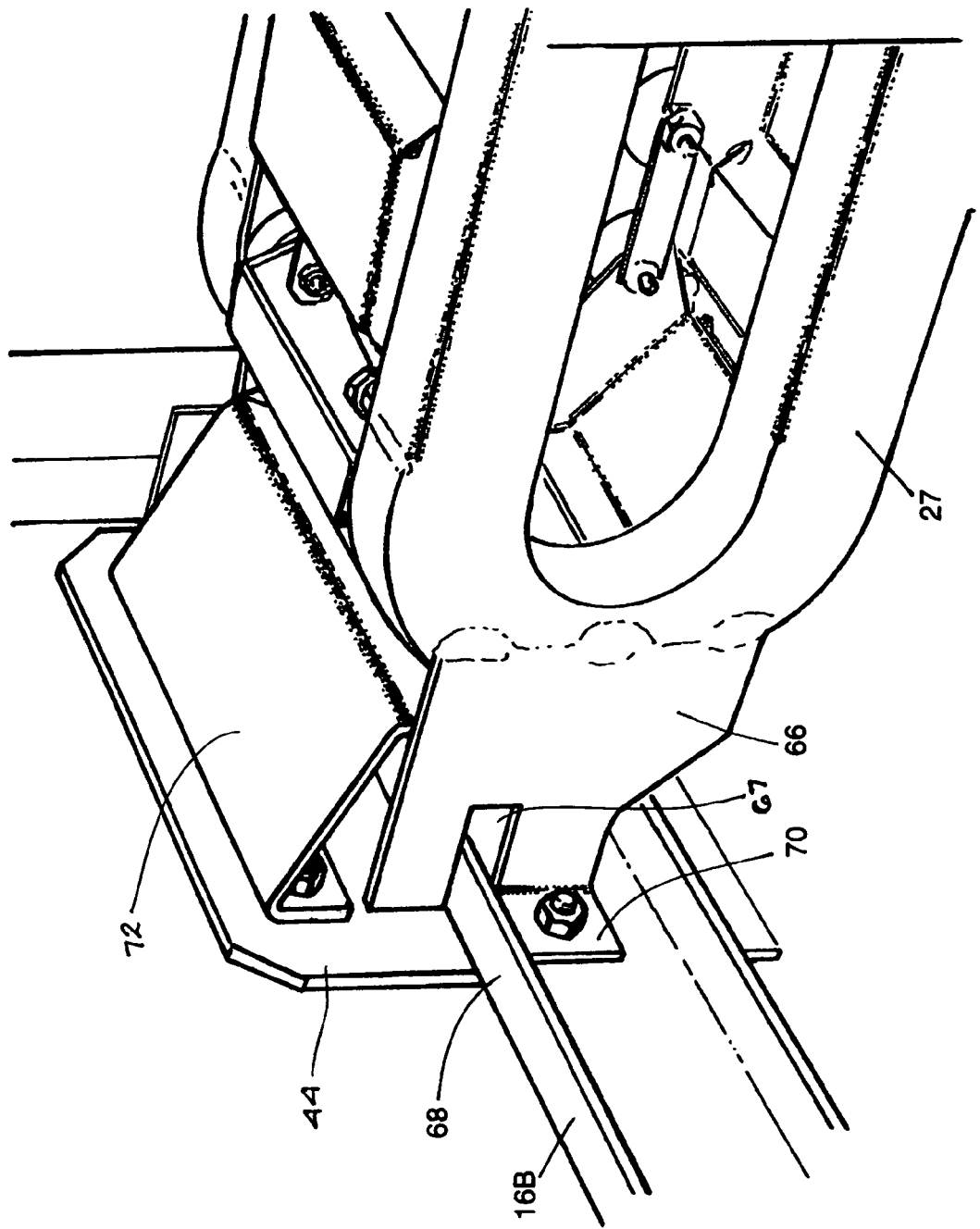
FIG. 8 is a perspective view showing the manner in which the end of a carriage unit module is attached to the rear end of a storage bay.
Figure 9:
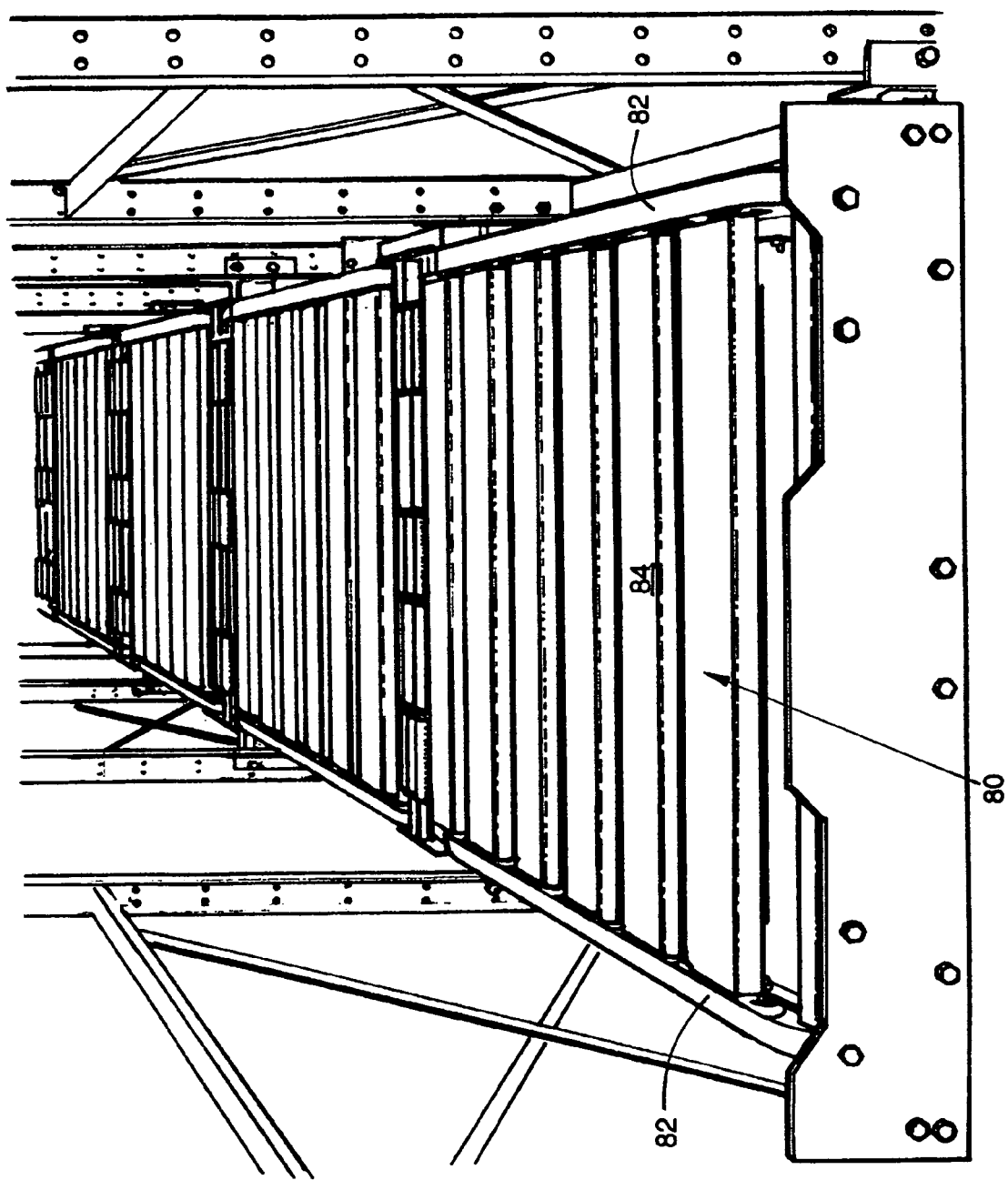
FIG. 9 is a perspective view of a second embodiment of the present invention wherein the pallet support mechanism comprises a single pallet carriage mechanism that extends the width of the storage bay, showing the rear end of the pallet support mechanism.
Figure 10:
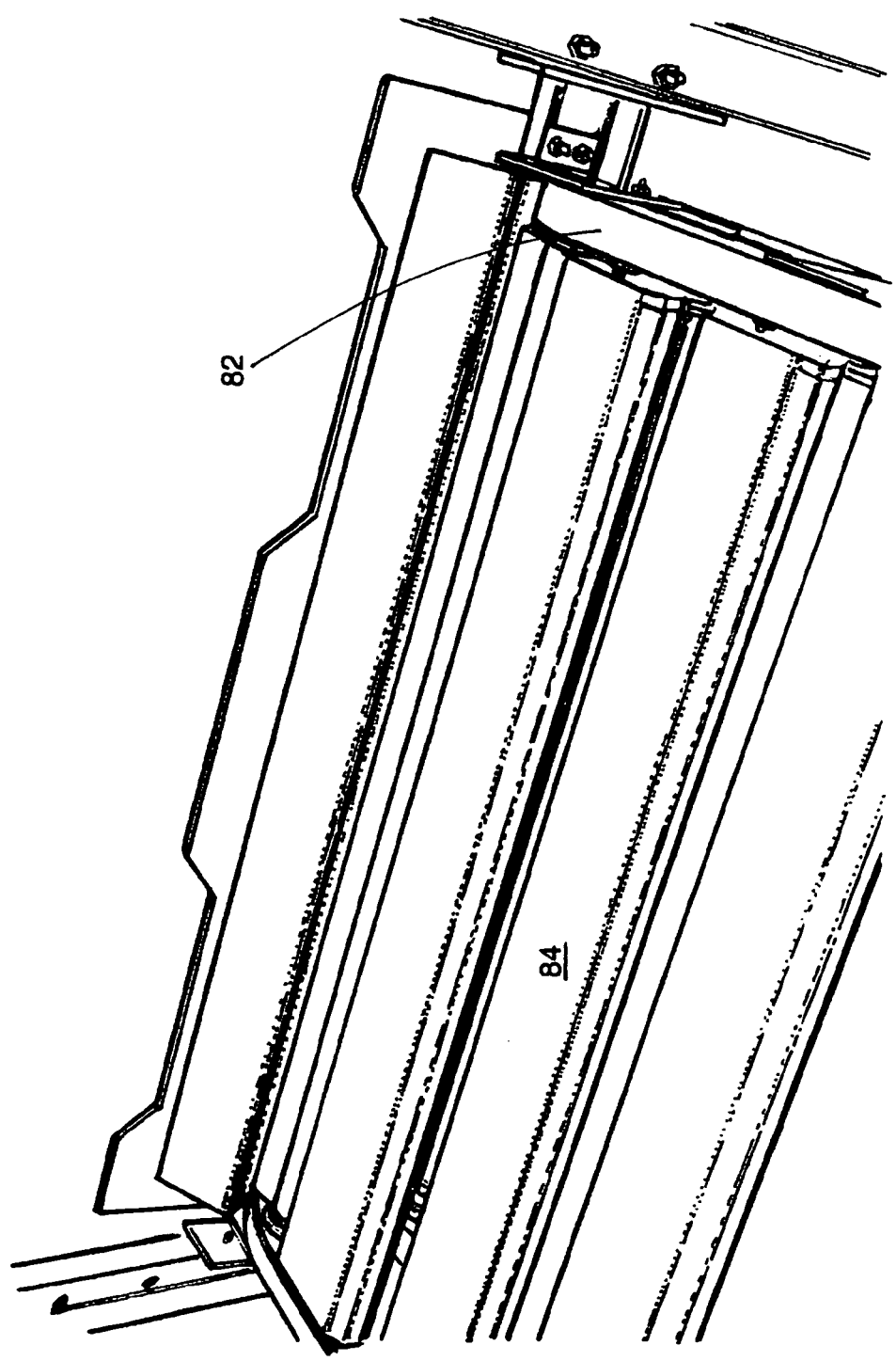
FIG. 10 is a perspective view of the pallet support mechanism of FIG. 9, taken from the forward side of the rear end of the system.

The manner in which the modular tracks are mounted at the ends of the pallet support mechanism is shown in FIG. 8. An end bracket 66 is attached to each track section 27 at the end of the rack. End bracket 66 has a slot 67 that fits over upper flange 68 of C-shaped end cross beam 16B. An outward extending flange 70 at the end of a portion of end bracket 66 below the slot 67 in the end of end bracket 66 is bolted to the vertical portion of beam 16B to securely hold the carriage unit module to the end of the rack. Upward and rearward sloped plate 72 bolted to stop plate 44 engages and decelerates a pallet before it hits the stop plate.

As shown in FIG. 4, the front end of the front module is connected to the front cross beam 16A in the same manner as the rearmost module is attached to the rear cross beam. End bracket 74 welded to the end of the track fits over flange 76, and the outer end of flange 74 is attached to the vertical portion of beam 16A.

The shape of the upper surface of carrier members 25 also is important in the smooth flow of the pallets from one modular section to the next. Carrier members 25 have a flat upper surface that is horizontal when the carrier members are positioned on a level stretch of track. Front and rear edges 78 of support surfaces 41 are inclined downward at an angle of approximately 45 degrees. This causes the outer edges of the support surfaces to miss the wheel support frame 62 and yet permit the support surface 41 of the carrier members to pass quite close (within ⅛ inch) to the wheel support frame. The inclined edges of the carrier support surfaces also reinforce the strength of the carrier support surfaces and resist bending of the surfaces under the weight of a pallet.

The installation and removal of each modular section is relatively simple. The modular section is simply dropped into place and bolted to the saddles or front and rear beams 16A and 16B at the ends of the track. The bolt fasteners are mounted in slots to some extent in order to provide some adjustment.

Figure 13:
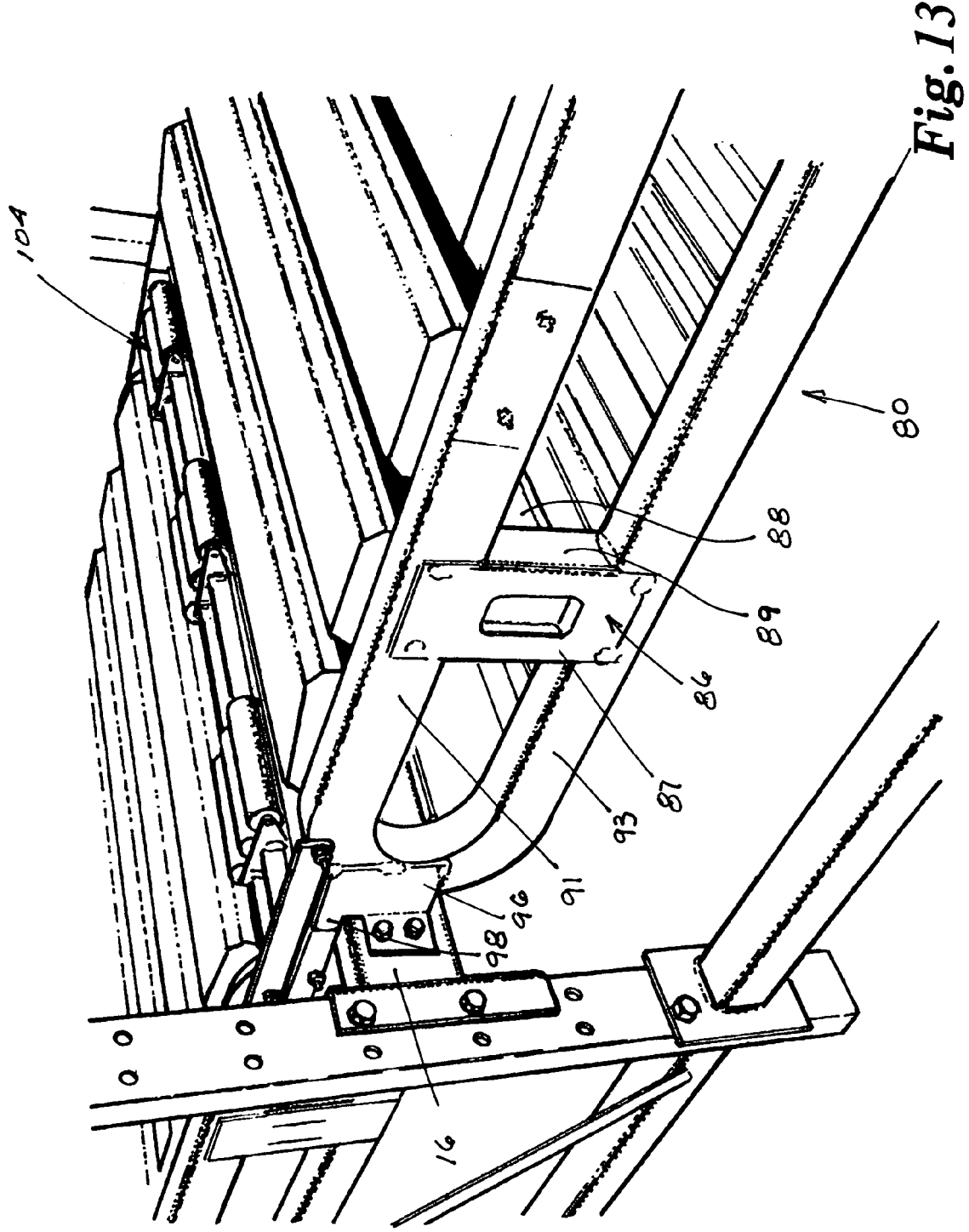
FIG. 13 is a perspective view of the pallet support mechanism of FIGS. 9-12, showing the manner in which the end of one carriage unit module is mounted on a horizontal cross beam.
Figure 18B:
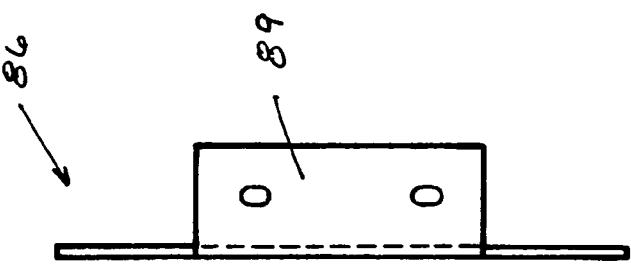
FIGS. 18A, 18B, and 18C are side elevation, right hand edge, and top views, respectively, of the outer spreader support bracket of the present invention.
Figure 18C:
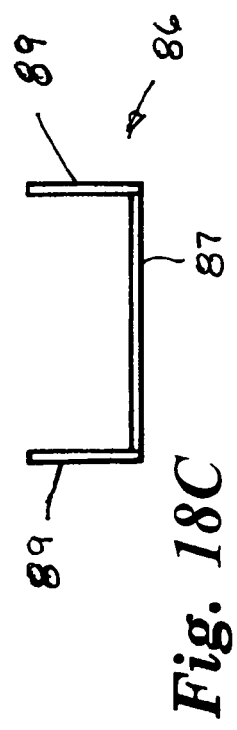
Figure 18A:
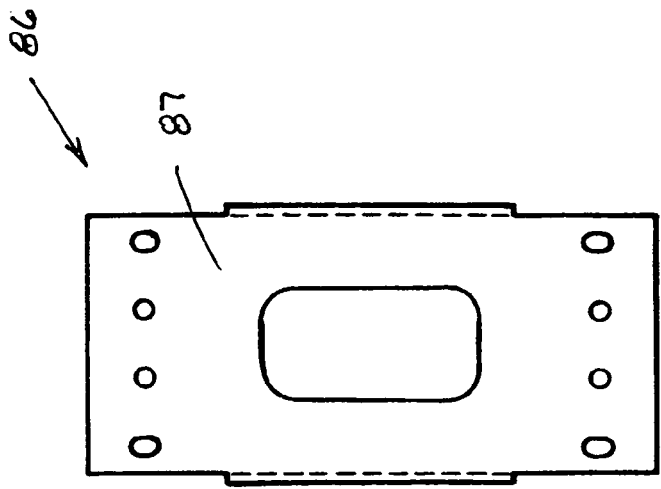
Figure 19B:
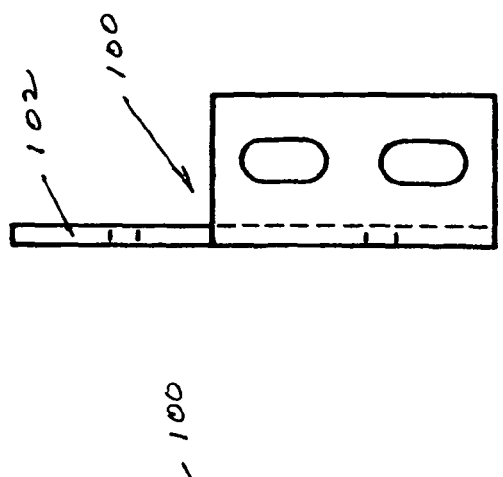
FIGS. 19A, 19B, and 19C are front elevation, right hand edge, and top views, respectively, of a slide mounting bracket of the present invention.
Figure 19C:
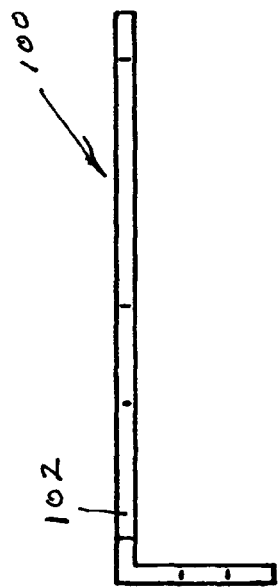
Figure 19A:
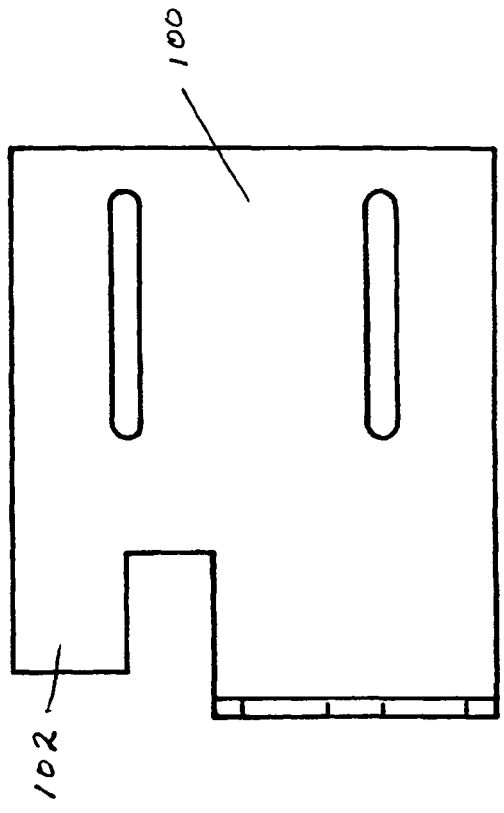
Figure 23:
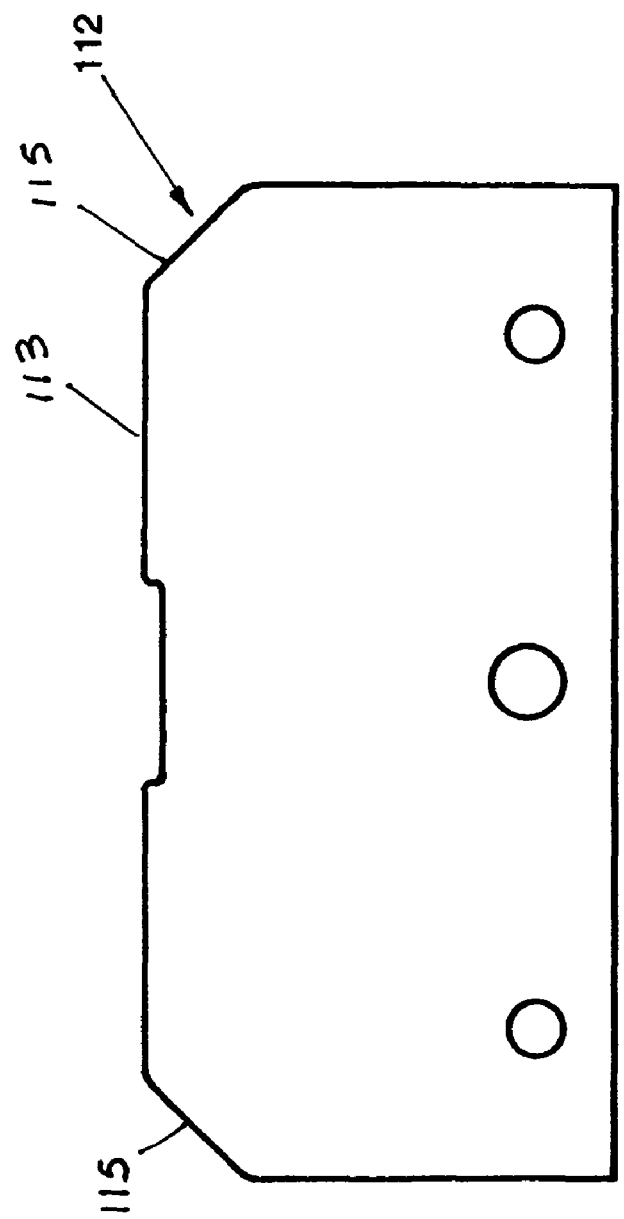
FIG. 23 is an enlarged detail view of the end view of FIG. 22C.

Another embodiment of the present invention is shown in FIGS. 9-23. In this embodiment, instead of two parallel tracks on opposite sides of the bay, a single module 80 of the pallet support mechanism extends for the full width of the bay, with left and right G-shaped track sections 82 being positioned adjacent the outer sides of the bay and with wider carrier elements 84 extending between the two track sections across the entire width of the bay and riding on the track sections on wheels 85. The track sections are substantially the same as the track sections in the previously embodiment. Track spreader support brackets 86 extend between upper and lower rails at spaced locations along the rails in order to reinforce the rails and maintain proper separation between the rails. The construction of the spreader support brackets is shown in FIGS. 18A-18C. As shown in FIG. 13 a face plate 87 is mounted on the sides of the upper and lower rails 91 and 93, while perpendicular flanges 89 fit between rails 91 and 93 and maintains the spacing between them.

Cross braces 88 extend between spreader support brackets on opposite sides of the track in order to maintain the lateral spacing of the separate track sections 82. The previous embodiment also employs braces between the track spreader supports, but the braces are of course shorter.

While the track sections 82 of the full width modules 80 can be attached to the cross beams in the same manner as the previous embodiment, an alternative fastening method is shown in FIGS. 11-15. This alternative fastening method can also be used in the previous embodiment.

Figure 11:
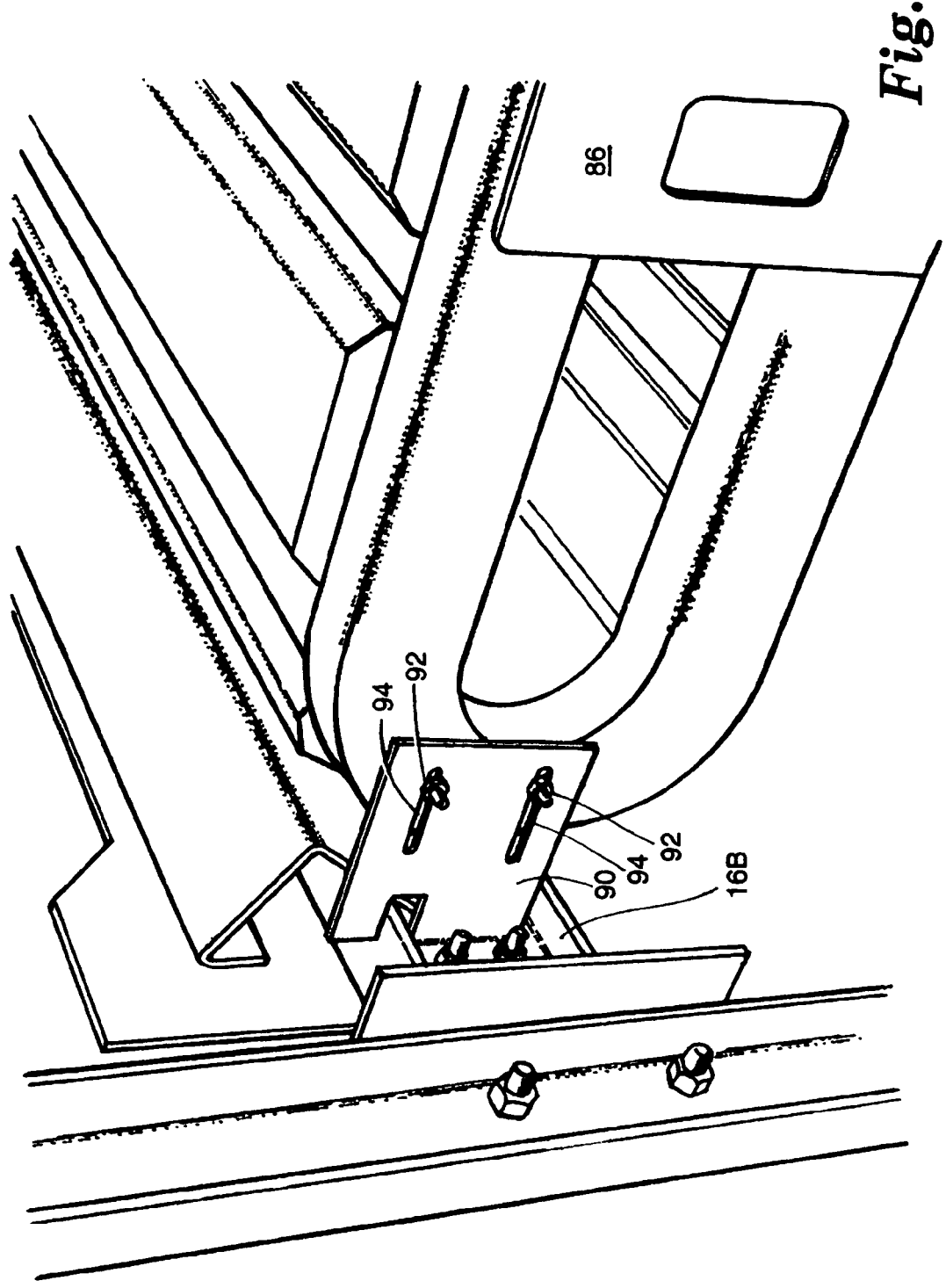
FIG. 11 is a perspective view of the rear end of the pallet support mechanism of FIG. 10, showing the manner in which the rear carriage unit module is attached to the rear load beam of the storage rack.
Figure 12:
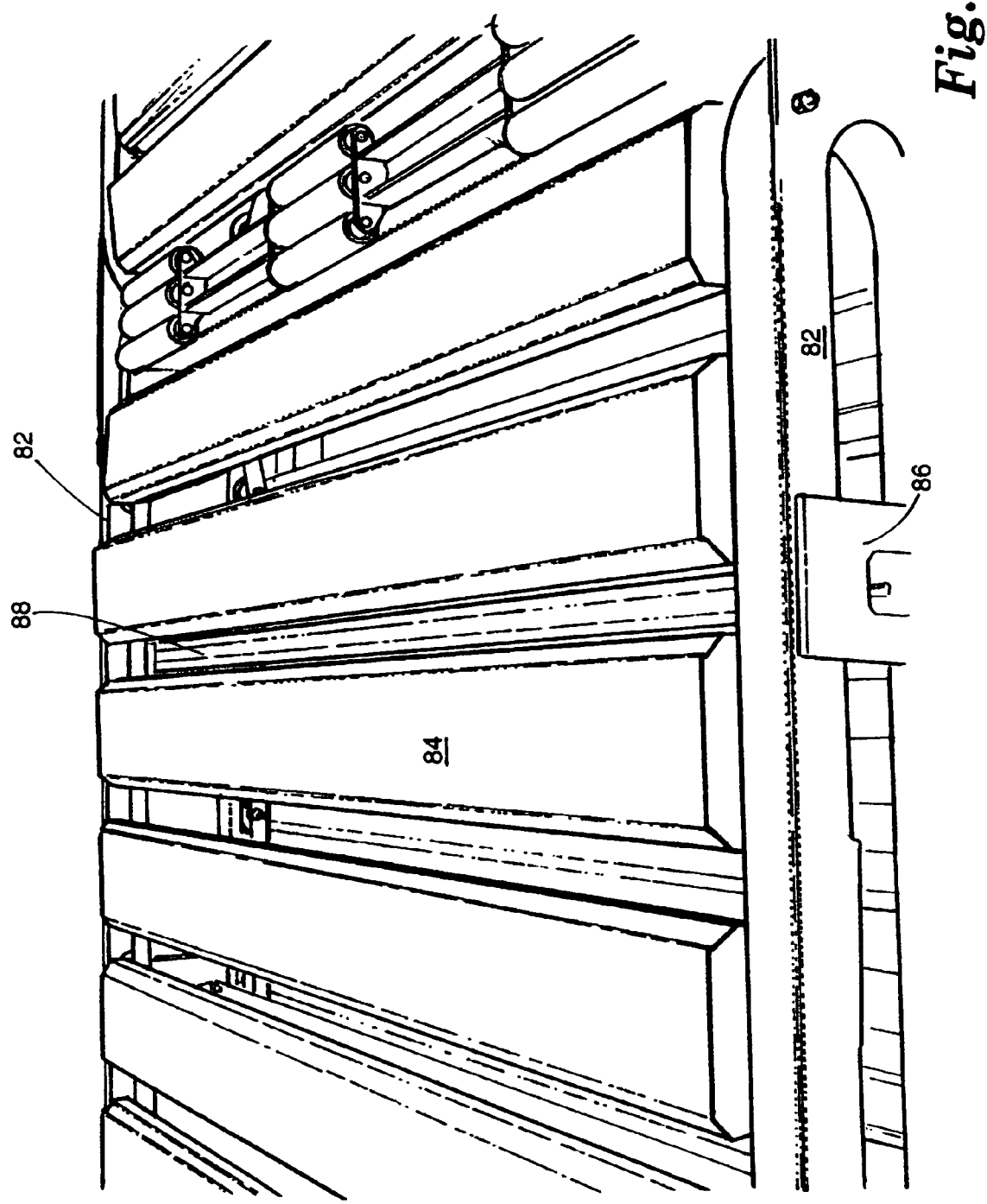
FIG. 12 is a perspective view of the pallet support mechanism of FIG. 9, taken from the side of the pallet support mechanism and showing the use of elongated cross braces that extend between spreader support brackets attached to each of the spaced left and right track sections.

In FIG. 11, the end of the rearmost track section is attached to rear cross beam 16B by means of a mounting flange 90 that is bolted (as opposed to being welded) to the track section by bolts 92 that ride in adjustable slots 94. This permits some adjustment of the bracket to accommodate beams that are mounted in somewhat different positions.

Figure 14:
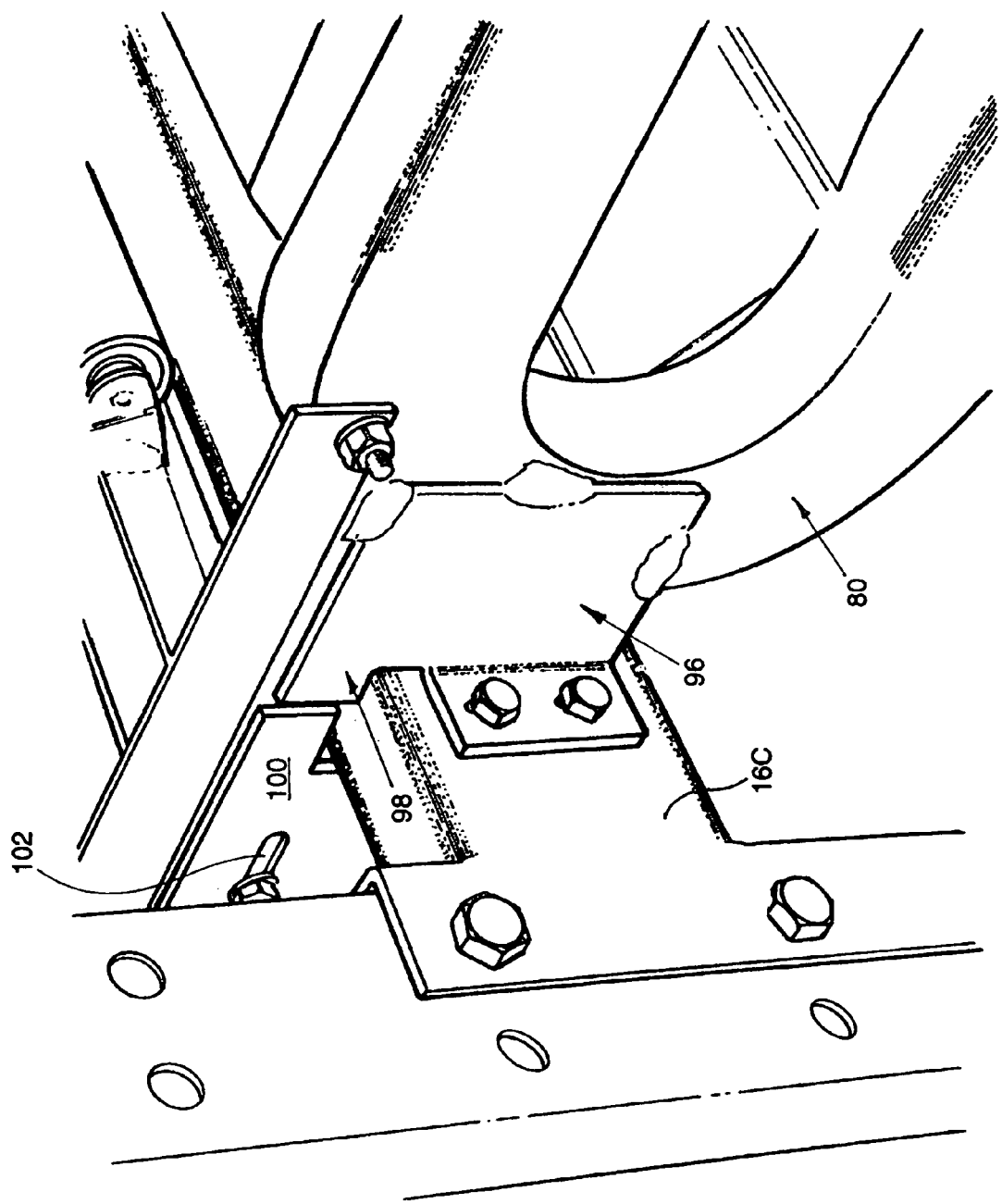
FIG. 14 is an enlarged view of the connection between the modular carriage unit of FIG. 13 and the horizontal cross beam, showing the use of a welded bracket to the end of a track.
Figure 15:
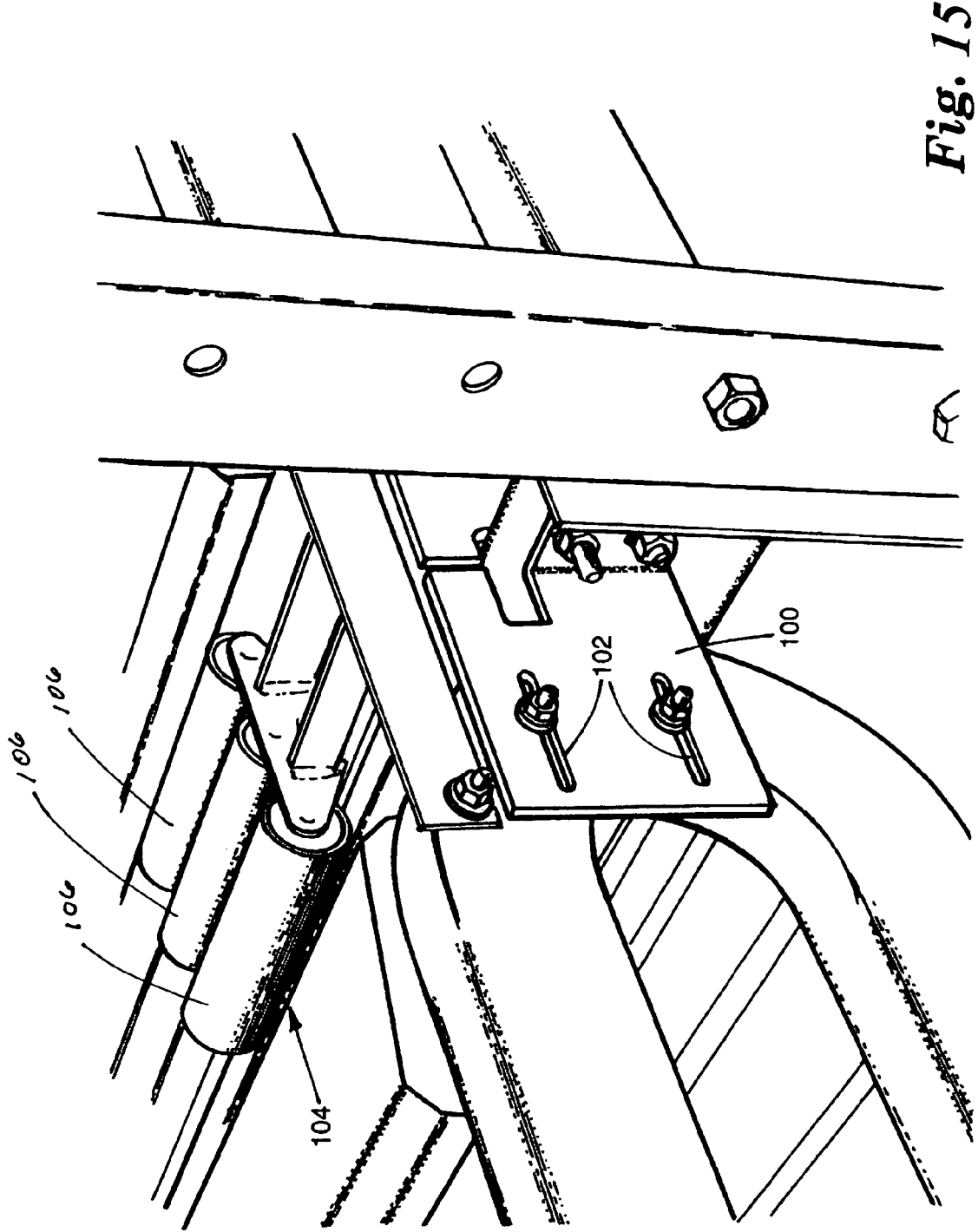
FIG. 15 is an enlarged view of the connection between the modular carriage unit of FIG. 13 and the horizontal cross beam, showing the same side of the carriage unit from an opposite perspective angle and showing the use of a bracket that is bolted to the carriage unit as opposed to being welded to the carriage unit and showing the end of the pallet transfer assembly employed with this embodiment of the invention.
Figure 16:
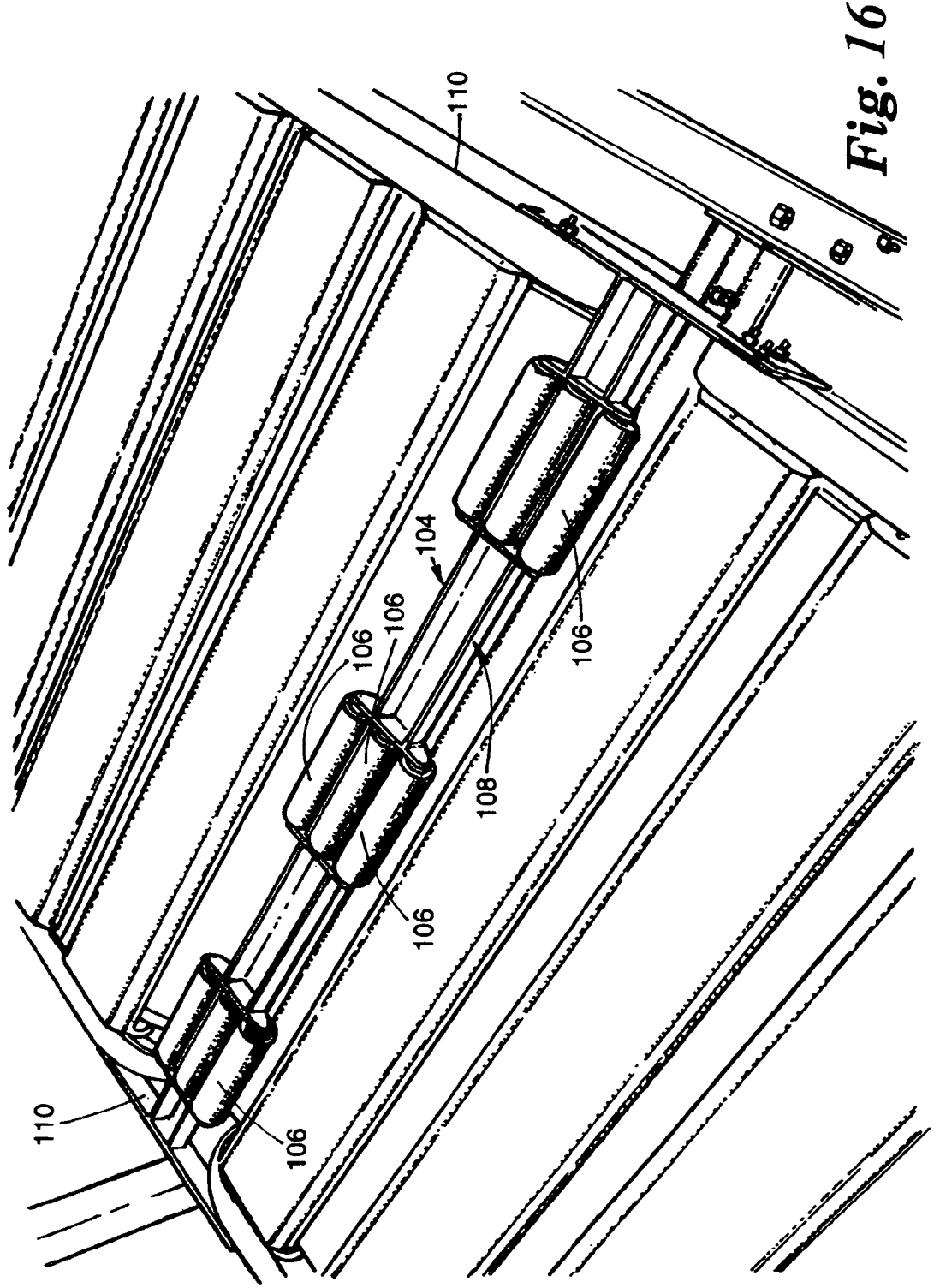
FIG. 16 is a perspective view of the pallet support mechanism of FIG. 9, showing the pallet transfer assembly employed in that embodiment of the invention.
Figure 17:
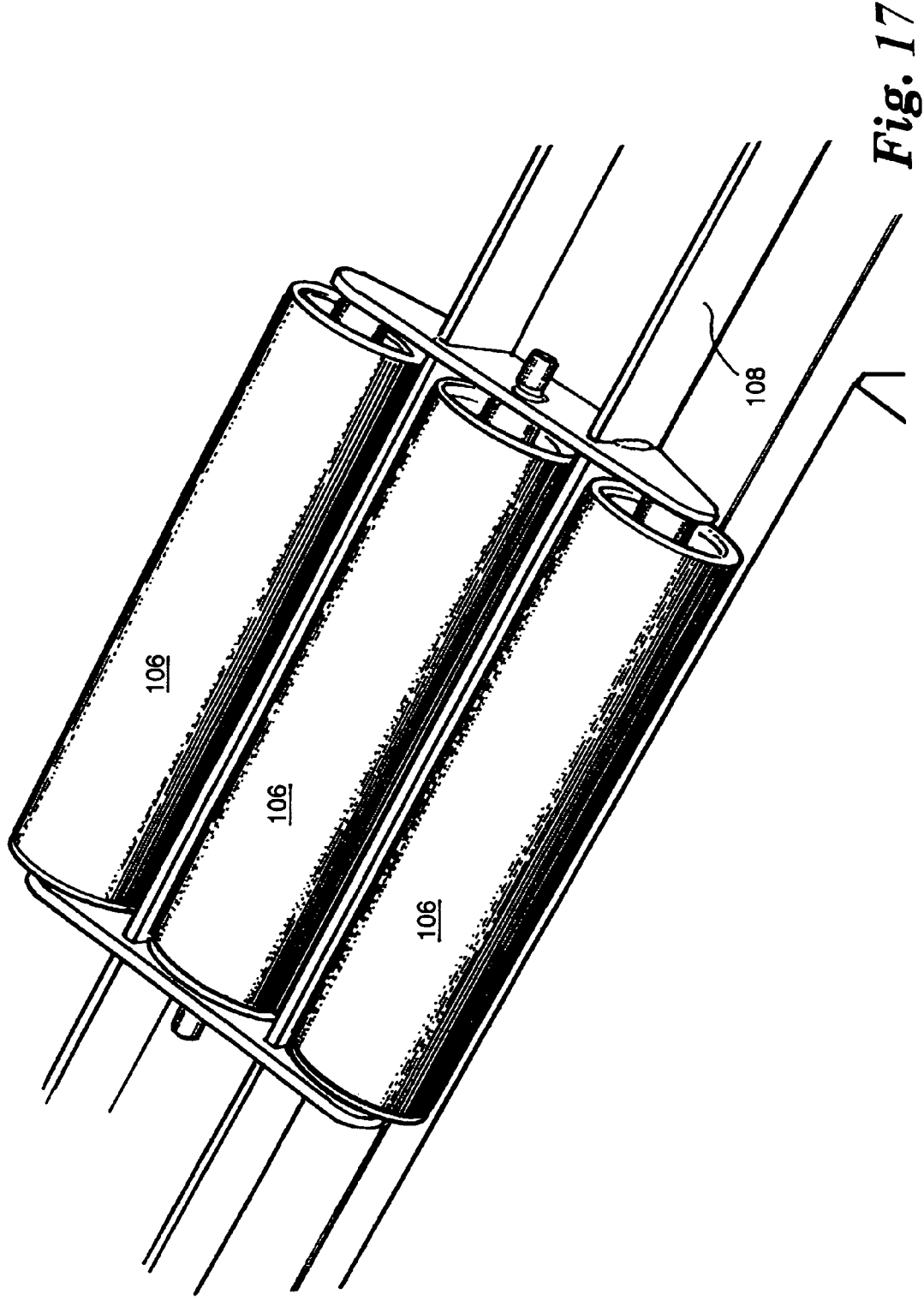
FIG. 17 is an enlarged perspective view showing one of the roller assemblies of the pallet transfer assembly of FIG. 16, and showing a clearance gap of about ⅛ inch between the end of the roller assembly and the end of the carrier member.

The manner in which intermediate sections of track modules are attached to intermediate cross beams is shown in FIGS. 13-15. A welded side bracket 96 is attached to the front end of module 80 in FIG. 13 and this bracket is bolted to the cross beam 16C. An outward extending flange 98 on the upper side of the side bracket rests on the top of the cross beam.

On the other side of the same beam, the rear end of the module on that side is attached to the same cross beam (by the same bolts) by a bracket 100 that is bolted to the track by means of adjustable slots 102. This permits the brackets to be adjusted so that variations in distances can be accommodated. Upper edges of the brackets rest on the beam. It is desired to have the side brackets on one module be welded and the side brackets on the adjacent module be bolted so as to permit some adjustment while retaining necessary rigidity.

The full width modules employ a transfer assembly 104 that is somewhat different from the transfer assembly of the more narrow modules. Transfer assembly 104 includes three spaced rollers 106 approximately six inches long at three lateral locations along the width of the pallet support mechanism and positioned between adjacent ends of carriage modules. The upper surfaces of the rollers are positioned at the same plane as the upper support surface of the carrier members. As with the previous embodiment, the rollers are mounted on a transverse support frame 108, and the support frame is mounted to the tracks on both sides of the transfer mechanism by brackets 110. The rollers are positioned so that they come within ⅛ of an inch from the carrier members as they pass downward around the curved end of the modules.

The horizontal support surface 113 of the carrier members 112 also is somewhat different in this embodiment. As in the previous embodiment, the front and rear trailing edges 115 of the support surfaces are inclined at an angle of 45 degrees in order to permit the support surfaces to come as close to the rollers without hitting them. In order to reinforce the elongated support surfaces from sagging under weight, a reinforcement channel 114 extends laterally along the length of the elongated carrier support surface, as shown in FIG. 22C.

Because the roller transfer assembly is also subjected to a substantial bending force when pallets pass over the roller transfer assembly, the roller transfer assembly is also reinforced to prevent sagging. The central roller in the roller transfer assembly is mounted in an upward facing U-shaped channel 116, and a V-shaped reinforcement member 118 is mounted on the bottom of the channel. The reinforcement member rides on the top of cross beam 16C and thus prevents the rollers from sagging under the weight of pallets passing over the rollers.

As in the previous embodiment, the roller transfer assembly also serves to dampen the momentum of pallets as they pass from one modular section to the next, thus impeding any increase in speed as the pallets roll along the pallet support mechanism. The position and height of the rollers insures that the pallets flow smoothly from one modular section to the other.

A third embodiment of a flow through system 150 is substantially similar in basics to the first embodiment discussed above and generally shown in the drawing at FIGS. 24-27. The same reference numbers will be used for commonly shared elements, items, or components.

The third embodiment 150 has a movable pallet carriage mechanism 152 mounted on horizontal beams 156 and extending in a longitudinal direction between the front and the back of a warehouse storage bay, or the like. The carriage mechanism 152 includes two laterally spaced rows of aligned, modular carriage units 24, which are discussed in greater detail above. The carriage units 24 of the example shown are noted to be of an endless loop, flexible link track construction and to have a series of carriers 25 that trace a generally oval track 26.

Figure 24:
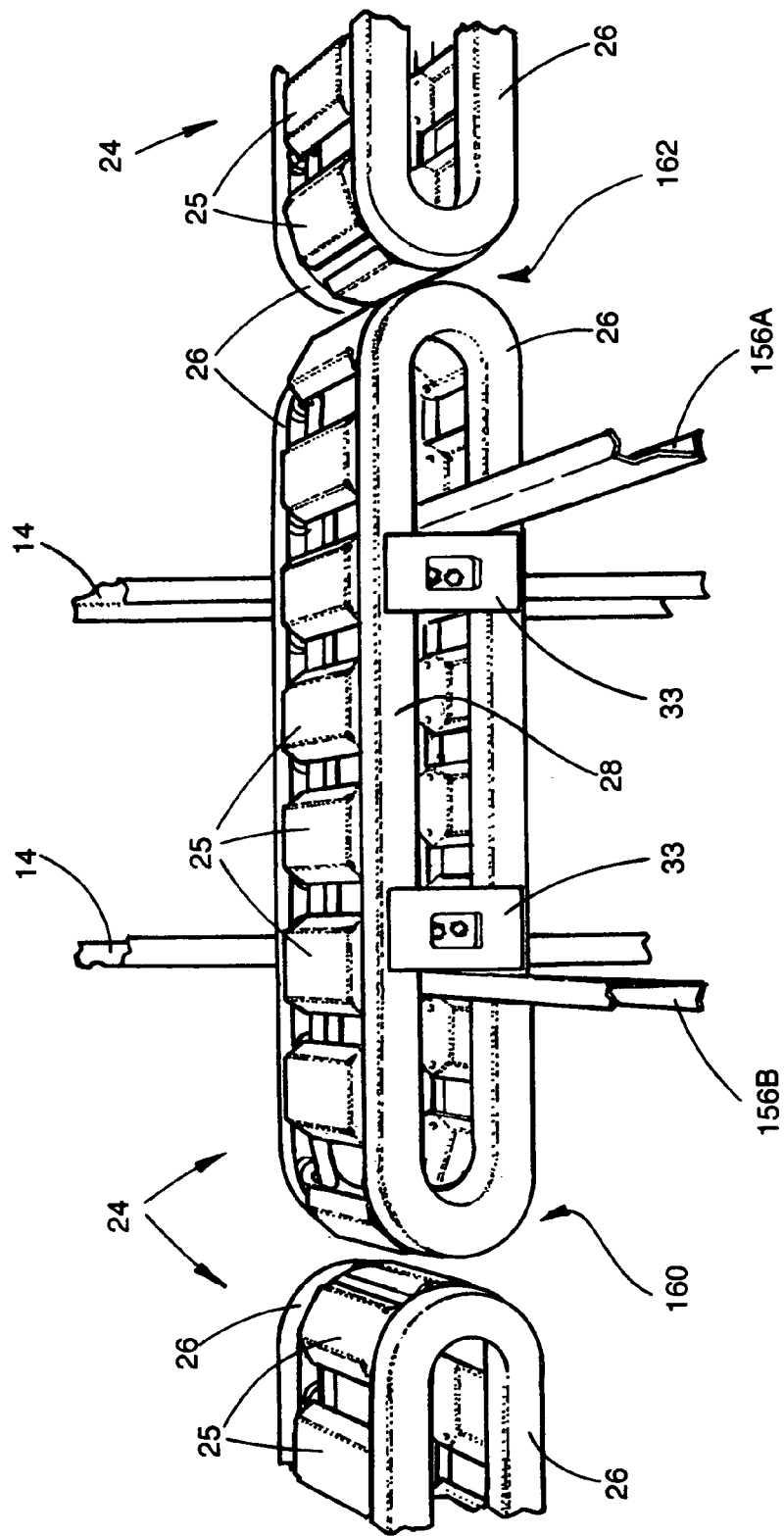
FIG. 24 is a modification of the side perspective view of FIG. 5 showing an alternative support of the modular carriage units by a warehousing rack frame.
Figure 25:
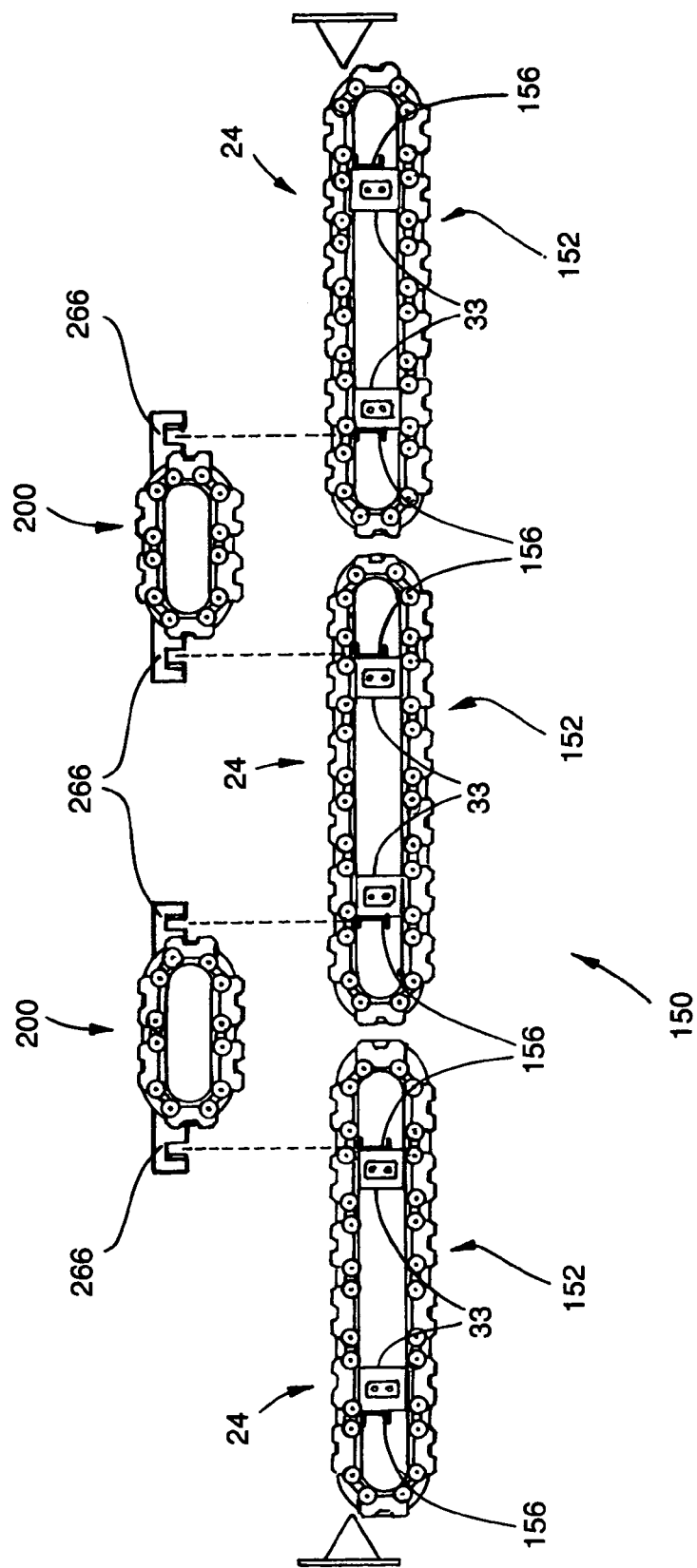
FIG. 25 is a schematic side elevation in exploded view of three modular carriage units thereof, showing insertion of inter-carriage transport units.
Figure 26:
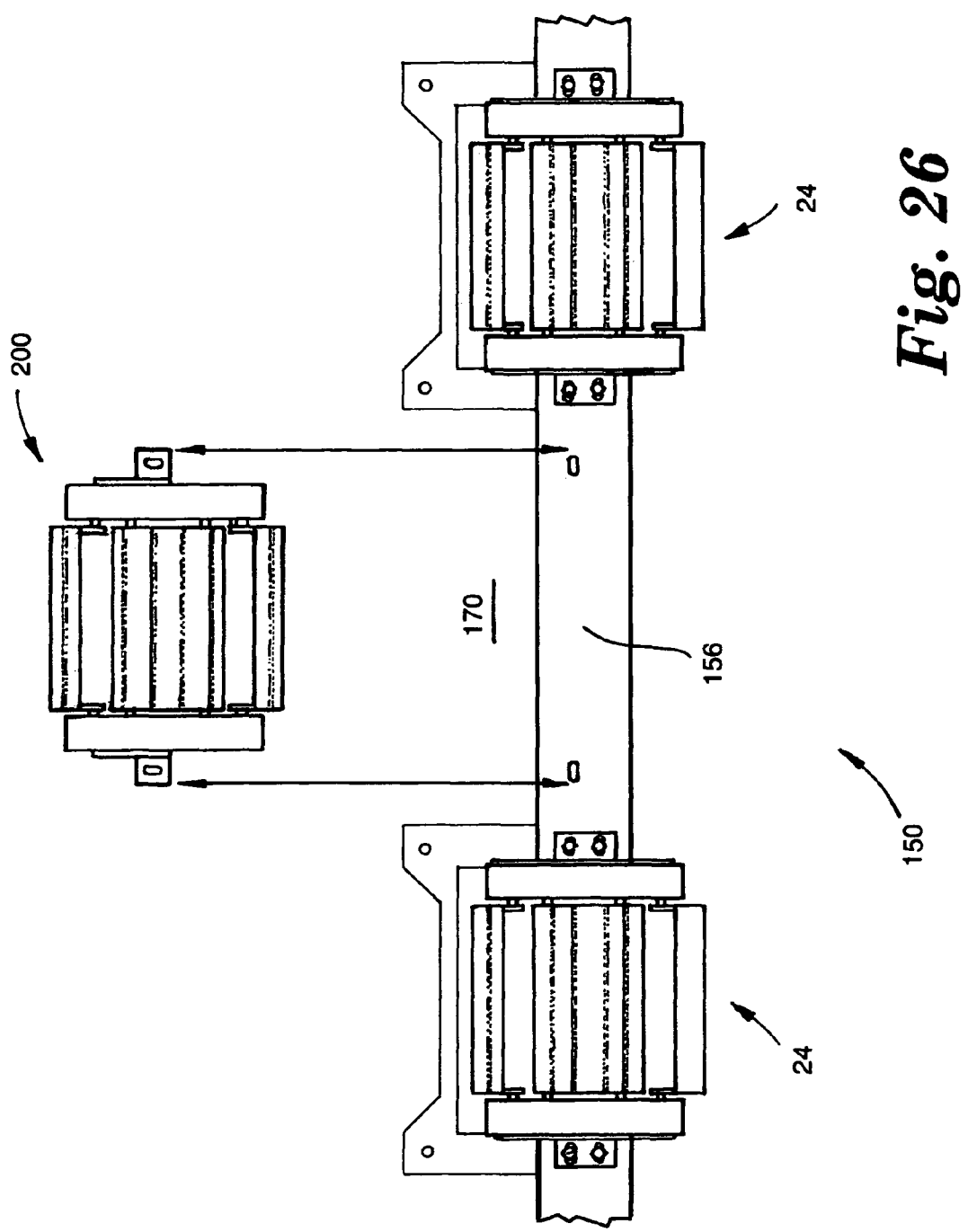
FIG. 26 is an end elevation view thereof.

While each carriage unit 24 of the first embodiment 10 is mounted at its front and back ends to the cross beams 16, each carriage unit 24 of the third embodiment 150 is mounted near its front and back ends 160 and 162, respectively, to the cross beams 156 (FIG. 24). A carriage length extends between the carriage ends. A first cross beam or carriage support 156A is located toward the front carriage end 160 from the back carriage end 162 and is closer to the carriage back end than to the carriage front end. Conversely, a second carriage support 156B is located toward the back carriage end 162 from the front carriage end 160 and is closer to the carriage front end than to the carriage back end.

The cross beams 156 extend through the tracks 26. The upper rail 28 of the track may rest upon the cross beam. The cross beams are preferably located to abut the track support brackets 33. To minimize jostling or shifting of the carriage units 24, they are fastened to the uprights 14 or to the cross beams by methods discussed above or by conventional methods as is known by one having ordinary skill in the art.

Figure 27:
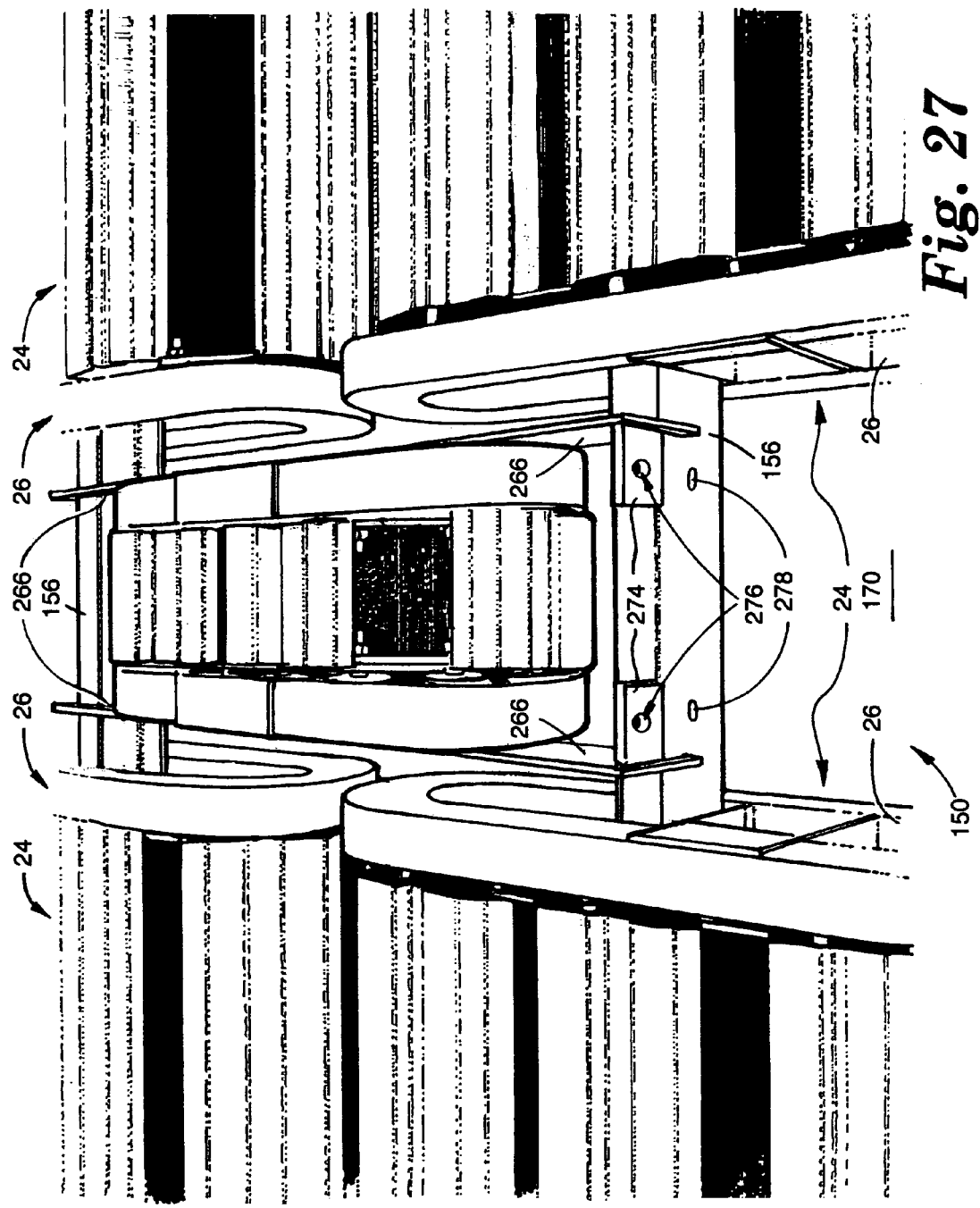
FIG. 27 is an end perspective view of a transport unit thereof, shown near an installed position, a near end of the mini-carriage transport unit being elevated.
Figure 28:
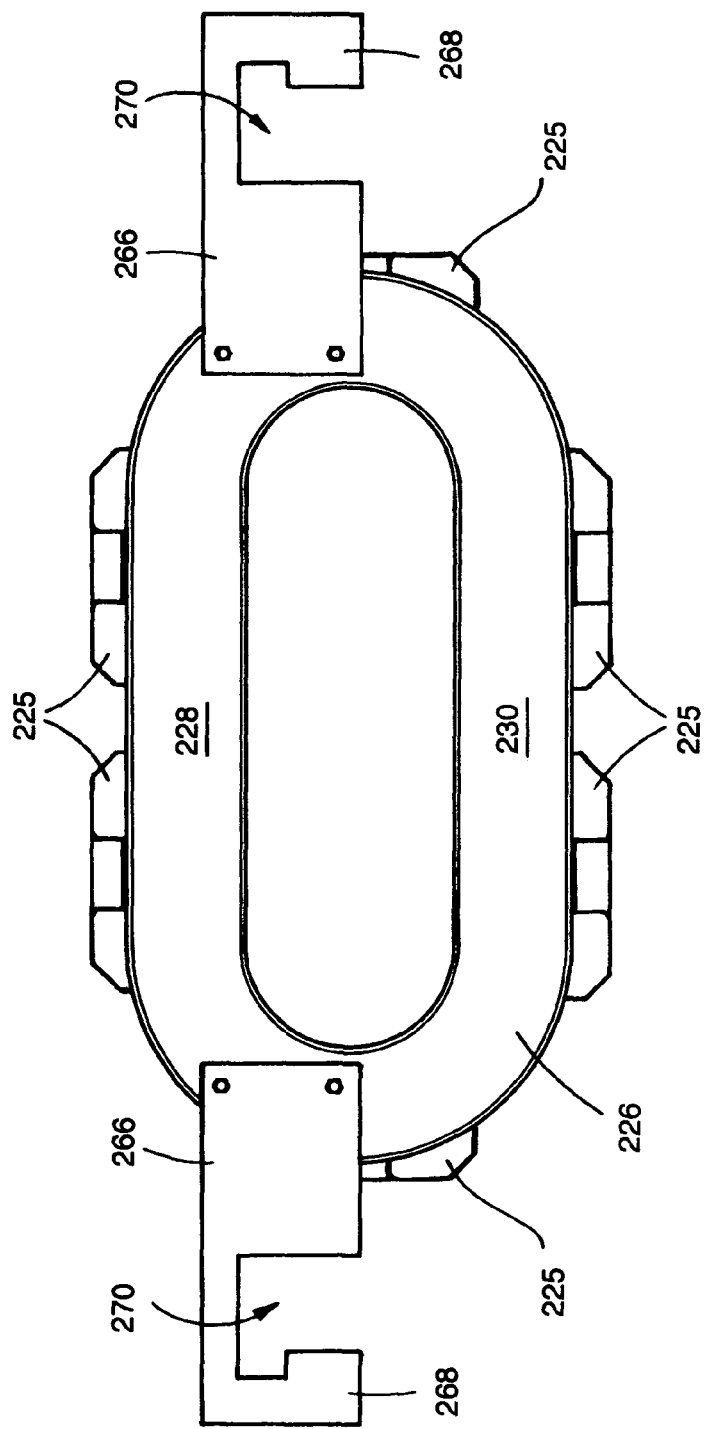
FIG. 28 is a side elevation view of an inter-carriage transport unit.
Figure 29:
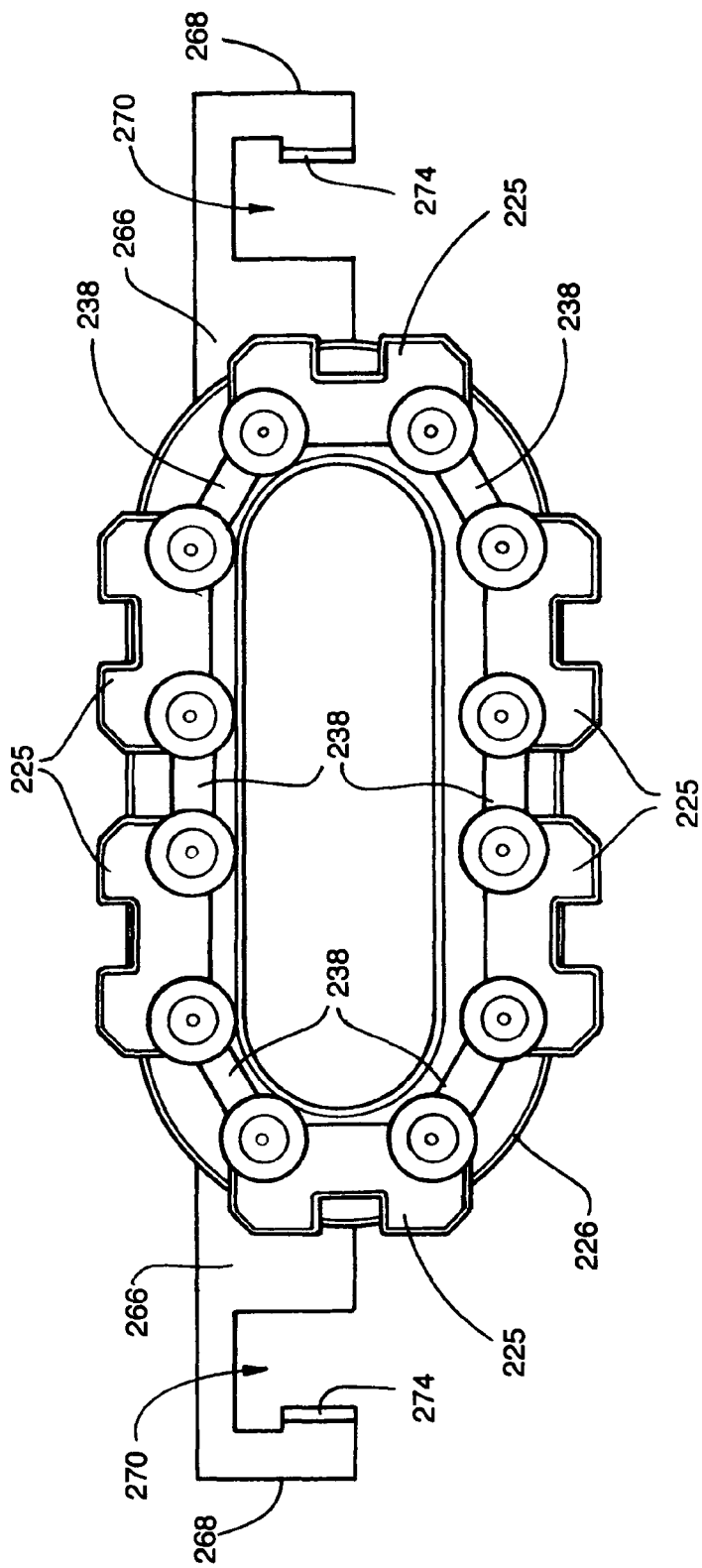
FIG. 29 is the view of FIG. 28 with a near track section removed.

The third embodiment of a flow through system 150 also includes an inter-carriage transfer unit 200, which is a mini-carriage unit. The mini-carriage transfer unit facilitates smooth flow of storage units 19, pallets, between adjacent pairs of carriage units 24. Thus the transfer unit 200 extends into the spaces 170 defined between adjacent pairs of carriage units (FIG. 27).

The mini-transfer unit 200 includes a series of wheeled carriers 225. The carriers are pivotally interconnected by links 238 and form a continuous loop link track. The carriers in the link track trace a generally oval track 226. The carriers, the links, and the track configure the mini-transfer unit as a shortened length variant of the carriage units 24, which is discussed in detail above. Thus, the above disclosure of the carriage unit 24 is relied upon and incorporated here by reference as disclosure of the mini-carriage unit, which is shorter in length as compared to the carriage unit 24. Because of the shortened length of the mini-transfer unit 200, its upper and lower support rails, 228 and 230, respectively, are relatively short and may not require stabilization with spreader support brackets 33 and cross braces 35 that the longer carriage units 24 may require. Further, similar to the end mounting of the carriage units 24 in the first embodiment of a modular storage rack 20 discussed above, the mini-carriage 200 is end mounted.

A pair of mounting plates or brackets 266 extends from each of the opposite ends of the mini-carriage 200. The pairs of mounting plates include mirror image brackets that extend lengthwise outward and away from the mini-carriage ends. Each mounting bracket may be welded, bolted, riveted, or otherwise fastened with the oval track 226.

The mounting brackets have a body that extends from the mini-carriage to a bracket terminal end 268. A downward opening notch 270 is formed in the bracket body near the terminal end. The notch is configured to receive a cross beam 156. Each mounting bracket also has a tab 274 for securing the mini-carriage to the cross beam. The tab extends inward from a distal edge of the notch, toward an opposing tab on the other bracket of the pair of mounting plates. Alternatively, the mounting brackets may be provided as L-shaped members, for example.

Cooperating mounting holes are provided on each tab and on the cross beam, 276 and 278, respectively, so the mini-carriage 200 may be secured to the storage bay frame by bolting, if desired. The mounting holes on one of the tab and the beam is a vertical oval or slot, while the corresponding mounting hole on the other of the beam and the tab is a horizontal oval or slot as shown. This relative perpendicular orientation of corresponding mounting holes accommodates loose tolerance location of the mounting holes and of the mini-carriage relative to the storage bay frame.

While the mini-carriage 200 may be bolted or otherwise fastened to the cross beams 156, it is desired that the mini-carriage is fastened to the cross beams. When the pairs of mounting plates are fastened to the cross beams, the mini-carriage is fixed relative to the storage bay frame and the opposite sides of the oval track 226 are fixed relative to one another.

It should be understood that the foregoing is merely exemplary of the preferred practice of the present invention and that various modifications in the arrangements and details of the construction disclosed herein may be made without departing from the spirit and scope of the present invention.

What is claimed is:

1. In a warehouse storage rack system comprising a frame structure comprising interconnected columns and cross beams that divide the rack into generally rectangular storage bays for depositing pallets or other storage units, and wherein the storage bays are more than one storage unit deep and the storage bays include wheeled carriage systems that support and carry the storage units rearwardly in the storage bay, so that additional storage units can be loaded into the storage bay at a front end thereof, the improvement wherein:

the storage bay is at least two storage bay sections deep, with the storage bay frame for each storage bay section comprising uprights at four corners and horizontal cross beams connecting the uprights at a bottom of the storage bay section;

the wheeled carriage system includes at least one endless loop wheeled conveyor section for individual storage bay sections in the storage bay, each conveyor section including an oval track extending longitudinally through each storage bay section in the storage bay and an endless loop wheeled conveyor mounted on the oval track, the track being mounted on the frame for each storage bay section, each storage bay section of the storage bay having one or more laterally spaced wheeled conveyor sections mounted on front and rear cross beams of the storage bay section and extending through the storage bay section, front and rear ends of longitudinally adjacent conveyor sections being adjacent but spaced apart; and a wheeled transfer assembly is mounted in the frame between the ends of adjacent conveyor sections, the transfer assembly being positioned to engage and support the storage units as they are transferred from one conveyor section to the next conveyor section.

2. A storage rack system as in claim 1 wherein each storage bay section of the frame includes lateral cross beams at front and rear portions of the storage bay section, with the cross beams being spaced inwardly from the ends of the storage bay section, such that there are longitudinally spaced cross beams between adjacent storage bay sections, the carriage system including two laterally spaced conveyor sections for each storage bay section, the transfer assembly comprising an oval, endless loop conveyor mounted to and extending between adjacent lateral cross beams of adjacent storage bay sections, the transfer assembly being positioned laterally between the laterally spaced conveyor sections in the storage bay.

3. A storage rack system as in claim 2 wherein the lateral cross beams are positioned inside the oval tracks for the conveyors.

4. A storage rack system as in claim 1 wherein the wheeled transfer assembly comprises one or more wheels rotatably mounted in a wheel support frame that is suspended between ends of longitudinally adjacent track sections, the wheels being positioned so as to maintain storage units at the same level as the conveyor sections as they are transferred from one conveyor section to the next conveyor section.

5. A storage rack system as in claim 4 wherein the wheel support frame includes arms that are releasably connected to longitudinally adjacent ends of track sections on each side of the transfer assembly so as to support the wheels between longitudinally adjacent track sections.

6. A storage rack system as in claim 5 wherein a single cross beam separates longitudinally adjacent track sections, with the track sections being mounted to the beam by support arms fixed to the beam, the support arms extending outwardly from the beam on each longitudinal side thereof and being releasably connected to the track section on each side of the beam.

7. A storage rack system as in claim 6 wherein at least one track section is mounted to the support arms by threaded fasteners that engage longitudinal slots in the arms, the longitudinal slots permitting longitudinal position adjustment of the track section with respect to the cross beam.

* * * * *